(12) United States Patent
Jiang

(10) Patent No.: US 12,490,050 B2
(45) Date of Patent: Dec. 2, 2025

(54) RANGING METHOD, COMMUNICATION NODE, COMMUNICATION DEVICE AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 404 days.

(21) Appl. No.: 18/024,209

(22) PCT Filed: Sep. 3, 2020

(86) PCT No.: PCT/CN2020/113310
§ 371 (c)(1),
(2) Date: Mar. 1, 2023

(87) PCT Pub. No.: WO2022/047708
PCT Pub. Date: Mar. 10, 2022

(65) Prior Publication Data
US 2023/0276194 A1    Aug. 31, 2023

(51) Int. Cl.
*H04W 4/02* (2018.01)
*H04W 12/03* (2021.01)
*H04W 76/14* (2018.01)

(52) U.S. Cl.
CPC ........... *H04W 4/023* (2013.01); *H04W 12/03* (2021.01); *H04W 76/14* (2018.02)

(58) Field of Classification Search
None
See application file for complete search history.

(56) References Cited

U.S. PATENT DOCUMENTS

| 10,914,814 | B1* | 2/2021 | de Haas | ............... G01S 5/02216 |
| 2020/0106877 | A1* | 4/2020 | Ledvina | ................ H04W 12/06 |
| 2020/0150262 | A1 | 5/2020 | Kim et al. | |

(Continued)

FOREIGN PATENT DOCUMENTS

| CN | 108023682 A | 5/2018 |
| CN | 108780538 A | 11/2018 |

(Continued)

OTHER PUBLICATIONS

Indian Patent Application No. 202347025299, Office Action dated Jan. 11, 2024, 6 pages.

(Continued)

*Primary Examiner* — Frantz Bataille
(74) *Attorney, Agent, or Firm* — Cozen O'Connor

(57) ABSTRACT

A ranging method performed by a first communication node includes send a ranging request message for ranging. The ranging request message carries a ranging parameter. The ranging parameter is configured to measure a relative position between the first communication node and a second communication node. A ranging method performed by a second communication node includes receiving a ranging request message for ranging sent by a first communication node. The ranging request message carries a ranging parameter. The ranging parameter is configured to measure a relative position between the first communication node and the second communication node.

18 Claims, 19 Drawing Sheets

(56) References Cited

U.S. PATENT DOCUMENTS

2020/0183000 A1  6/2020  Li et al.
2020/0275244 A1  8/2020  Lee et al.

FOREIGN PATENT DOCUMENTS

| CN | 110730413 A | 1/2020 |
| KR | 20200074661 A | 6/2020 |
| WO | WO 2020068991 A1 | 4/2020 |
| WO | WO 2020168080 A1 | 8/2020 |

OTHER PUBLICATIONS

Chinese Patent Application No. 202080002145.9, Office Action dated Apr. 18, 2022, 8 pages.
Chinese Patent Application No. 202080002145.9, English translation of Office Action dated Apr. 18, 2022, 11 pages.
European Patent Application No. 20951955.2 Search Report dated Apr. 24, 2024, 8 pages.
PCT/CN2020/113310, English translation of Search Report dated May 26, 2021, 3 pages.

\* cited by examiner

RANGING METHOD, COMMUNICATION NODE, COMMUNICATION DEVICE AND STORAGE MEDIUM

CROSS-REFERENCE TO RELATED APPLICATION

This application is a national phase of International Application No. PCT/CN2020/113310, filed on Sep. 3, 2020, the content of which is hereby incorporated by reference in its entirety.

TECHNICAL FIELD

The disclosure relates to, but is not limited to, a field of wireless communication technologies, and particularly to a ranging method, a first communication node, a second communication node, a communication device and a storage medium.

BACKGROUND

With the development of terminal positioning technologies, relative positioning between terminals is a feature that enhances user experience in many situations. For example, in large parking lots, the positioning between a mobile phone and a vehicle facilitates the vehicle owner to quickly determine the position of the vehicle through the mobile phone. In order to support direct communication between terminals, a wireless communication mode, such as sidelink, is introduced. In the sidelink mode of communication, an interface between terminals is referred to as PC-5.

SUMMARY

Embodiments of the disclosure provide a ranging method performed by a first communication node. The method includes:
  sending a ranging request message for ranging;
  in which the ranging request message carries a ranging parameter; the ranging parameter is configured to measure a relative position between the first communication node and a second communication node.

According to a second aspect of embodiments of the disclosure, a ranging method performed by a second communication node is provided. The method includes:
  receiving a ranging request message for ranging sent by a first communication node;
  in which the ranging request message carries a ranging parameter; the ranging parameter is configured to measure a relative position between the first communication node and a second communication node.

According to a third aspect of embodiments of the disclosure, a communication device is provided. The communication device includes:
  a processor; and
  a memory configured to store instructions executable by the processor;
  in which the processor is configured to perform the method as described in the above any embodiment when running the instructions.

According to a fourth aspect of embodiments of the disclosure, a computer storage medium is provided. The computer storage medium has a program executable by a computer. When the computer executable program is executed by a processor, the method as described in the above any embodiment is performed.

DETAILED DESCRIPTION

The embodiments will be described in detail here, and examples thereof are shown in the accompanying drawings. When the following descriptions refer to the accompanying drawings, same numbers in different drawings represent same or similar elements unless otherwise indicated. The implementations described in the following embodiments do not represent all implementations consistent with embodiments of the disclosure. Rather, they are merely examples of apparatuses and methods consistent with some aspects of the disclosure as detailed in the appended claims.

The terms described in the embodiments of the disclosure are only for the purpose of describing specific embodiments and are not intended to limit the embodiments of the disclosure. The singular forms "a", "the" used in the embodiments of the disclosure and the appended claim are also intended to include plural forms, unless the context clearly indicates otherwise. It is understandable that the term "and/or" used in the disclosure means and includes any or all possible combinations of one or more associated listed items.

It is understandable that, although the terms first, second, third, etc. may be used in embodiments of the disclosure to describe various information, such information shall not be limited to these terms. These terms are only used to distinguish the same category of information. For example, without departing from the scope of embodiments of the disclosure, first information may also be referred to as second information, and similarly, second information may also be referred to as first information. Depending on the context, for example, the word "if" as used herein may be interpreted as "in a case that" or "when" or "in response to determining".

The terms used herein are "greater than" or "less than" when representing a size relationship for purposes of conciseness and ease of understanding. However, it is understandable for those skilled in the art that the term "greater than" covers the meaning of "greater than or equal to", and "less than" covers the meaning of "less than or equal to".

Figure 1:
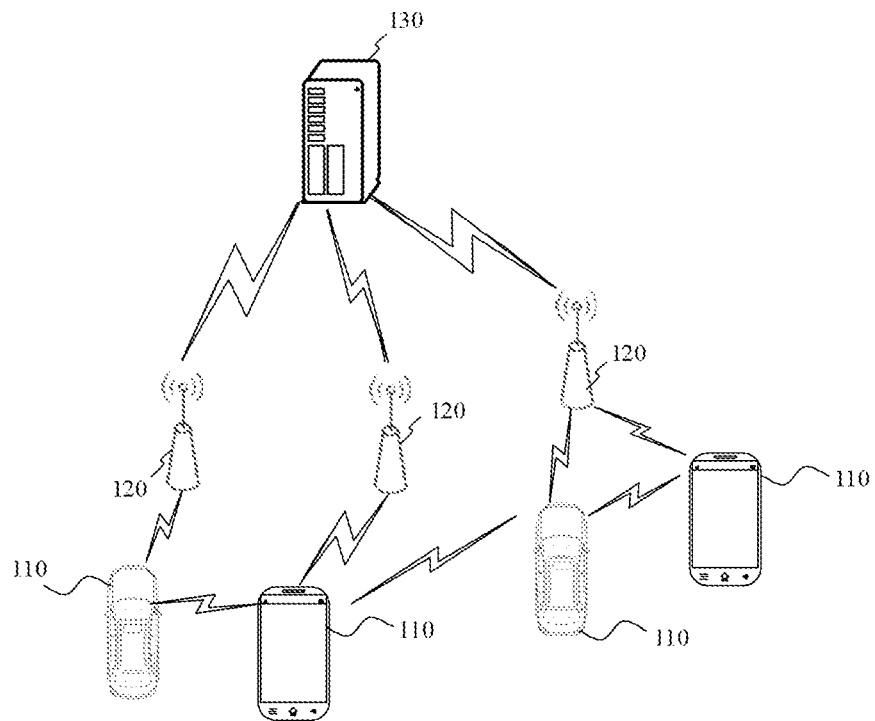
FIG. 1 is a schematic diagram illustrating a wireless communication system.

FIG. 1 is a schematic diagram illustrating a wireless communication system according to embodiments. As illustrated in FIG. 1, the wireless communication system is a communication system based on a cellular mobile communication technology. The wireless communication system may include several user equipment (UEs) 110 and several base stations 120.

The UE 110 may refer to a device that provides voice and/or data connectivity for a user. The UE 110 may communicate with one or more core networks through a radio access network (RAN). The UE 110 may be an Internet of Things (IoT) UE, such as a sensor device, a mobile phone (or referred to as a cellular phone), or the UE 110 may be a computer having an IoT UE, such as a fixed, portable, compact, handheld, computer built-in or vehicle-mounted apparatus. For example, a station (STA), a subscriber unit, a subscriber station, a mobile station, a mobile, a remote station, an access point, a remote terminal, an access terminal, an access terminal, a user terminal, a user agent, a user device or a user equipment (UE). In some examples, the UE 110 may be a device of an unmanned vehicle. In some examples, the UE 110 also may be a vehicle-mounted device, such as a vehicle-mounted computer with a wireless communication function, or a wireless UE externally connected to a vehicle-mounted computer. In some example, the UE 110 also may be a roadside device, such as a street lamp, a signal lamp or other roadside devices with a wireless communication function.

The base station 120 may be a network side device in the wireless communication system. The wireless communication system may be a fourth generation mobile communication (4G) system, also referred to as long term evolution (LTE) system, or a fifth generation mobile communication (5G) system, also referred to as New Radio (NR) system or a 5G NR system, or a next generation mobile communication system of the 5G system. An access network in the 5G system may be referred to as a New Generation-Radio Access Network (NG-RAN).

The base station 120 may be an eNB adopted in the 4G system. Alternatively, the base station 120 may be a base station with a centralized-distributed architecture (gNB) in the 5G system. When the base station 120 adopts the centralized-distributed architecture, it generally includes a central unit (CU) and at least two distributed units (DUs). Protocol stacks at a Packet Data Convergence Protocol (PDCP) layer, a Radio Link Control (RLC) layer and a Media Access Control (MAC) layer are configured in a CU; a physical (PHY) layer protocol is configured in a DU. The specific implementation of a base station 120 is not limited in embodiments of the disclosure.

The base station 120 may establish a wireless connection with the UE 110 through a radio interface. In different implementations, the radio interface is based on a 4G standard; or, the radio interface is based on a 5G standard, such as a new radio interface; or, the radio interface may be a radio interface based on a next generation mobile communication network technology standard of a 5G.

In some embodiments, an End to End (E2E) connection may be established between UEs 110. It may be applied to scenarios such as vehicle to vehicle (V2V) communication, vehicle to infrastructure (V2I) communication and vehicle to pedestrian (V2P) communication in vehicle to everything (V2X).

The above UE may be considered as the terminal in the following embodiments.

In some embodiments, the wireless communication system further may include a network management device 130.

Several base stations 12 are respectively connected to the network management device 130. The network management device 130 may be a core network device in a wireless communication system, and for example, the network management device 130 may be a Mobility Management Entity (MME) in an Evolved Packet Core (EPC). Alternatively, the network management device may be other core network devices, such as a Serving GateWay (SGW), a Public Data Network GateWay (PGW), a Policy and Charging Rules Function (PCRF) or a Home Subscriber Server (HSS), etc. The implementation form of the network management device 130 is not limited in embodiments of the disclosure.

In order to facilitate understanding of embodiments of the disclosure, a ranging method between terminals is described here.

In an embodiment, a ranging-based service can provide services based on determining a relative position between terminals. The relative position between terminals may be determined by relative positioning. The relative positioning may be determining a relative distance and/or a relative angle between terminals. The relative distance may be an absolute distance between terminals. The relative angle may be an angle of arrival (AOA) or an angle of departure (AOD). Here, the relative positioning may be achieved by performing the ranging.

Figure 2:
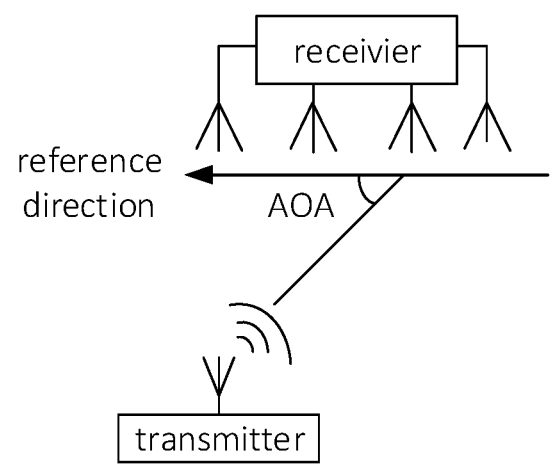
FIG. 2 is a flowchart illustrating a method for relative positioning according to some embodiments.
Figure 3:
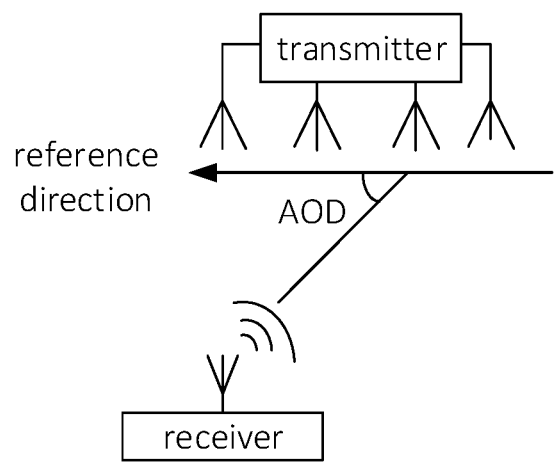
FIG. 3 is a schematic diagram of relative positioning according to some embodiments.

In an embodiment, as illustrated in FIG. 2, the AOA may be an included angle between a direction in which a receiver of a terminal receives a signal and a reference direction. In an embodiment, as illustrated in FIG. 3, the AOD may be an included angle between a direction in which a transmitter of a terminal sends a signal and a reference direction. In an embodiment, the reference direction is a direction determined based on a position and/or a shape of an antenna.

Figure 4:
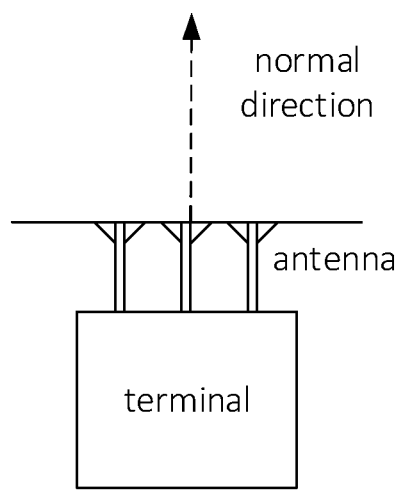
FIG. 4 is a schematic diagram illustrating aspects of relative positioning according to some embodiments.

In an embodiment, as illustrated in FIG. 4, a direction in which a terminal points is a normal direction of an antenna array of the terminal, and the reference direction may be a direction perpendicular to the normal direction.

Figure 5:
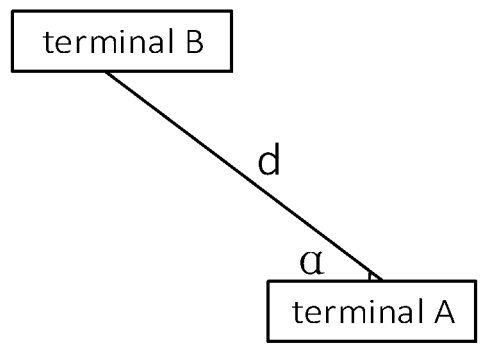
FIG. 5 is a schematic diagram illustrating aspects of relative positioning according to some embodiments.

In an embodiment, a relative position between two terminals may be determined by the relative distance and/or the relative angle. In an embodiment, the relative position between two terminals may be determined by both the relative distance and the relative angle. As illustrated in FIG. 5, in an embodiment, the terminal A may determine the relative position of a terminal B relative to the terminal A by acquiring the relative distance d between the terminal A and the terminal B and the angle of arrival (AOA) α that the signal sent by the terminal B arrives at the terminal A. In an embodiment, the terminal A may determine the relative position of the terminal B relative to the terminal A by obtaining the relative distance between the terminal A and the terminal B and the angle of departure (AOD) a that the signal sent by the terminal A departs from the terminal A.

In an embodiment, a startup terminal may send an initial ranging signal when performing the relative positioning between terminals. A feedback terminal sends a feedback ranging signal, as a feedback, to the startup terminal after receiving the initial ranging signal. The startup terminal calculates the relative distance between these two terminals based on a time difference between the time of sending the initial ranging signal and the time of receiving the feedback ranging signal after receiving the feedback ranging signal. Also, the terminal may calculate the relative angle by measuring a relationship between the direction of a corresponding ranging signal and a corresponding reference direction of a terminal. The relative positioning between terminals is performed based on the relative distance and the relative angle.

In an embodiment, the ranging method includes a single-sided ranging method and a double-sided ranging method. The single-sided ranging method is a method with which a terminal of one party participates in the calculation of time of flight (TOF). The double-sided ranging method is a method with which terminals of both parties participate in the calculation of time of flight (TOF).

In an embodiment, the distance between terminals=TOF× speed of light.

Figure 6:
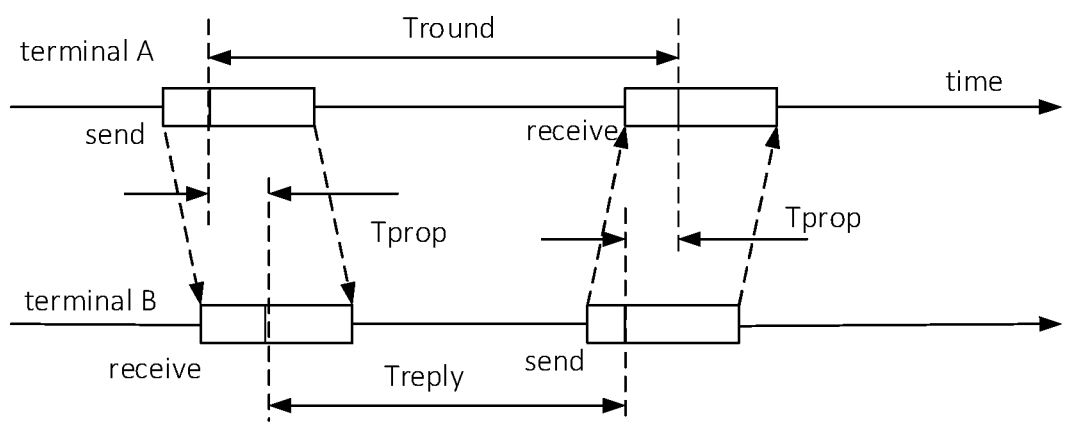
FIG. 6 is a schematic diagram illustrating a method for relative positioning according to some embodiments.

In an embodiment, as illustrated in FIG. 6, for the single-sided ranging method, the calculation of TOF may include the following steps:

At step a1, a terminal A measures a length of time Tround;
at step a2, a terminal B measures a length of time Treply;
at step a3, the terminal B sends the length of time Treply to the terminal A; and
at step a4, a TOF is calculated: TOF=Tprop=(Tround−Treply)/2.

Figure 7:
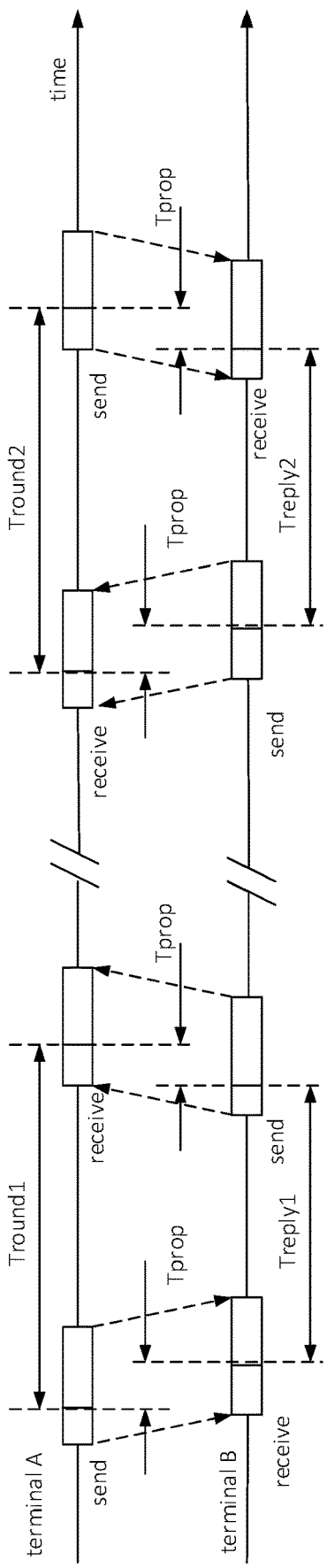
FIG. 7 is a flowchart illustrating a method for relative positioning according to some embodiments.

In an embodiment, as illustrated in FIG. 7, for the double-sided ranging method, the calculation of the TOF may include the following steps:

At step b1, the terminal A initiates a first round of ranging, to calculate going there and back lengths of time Tround1 and Treply1 of the first round of ranging signal;
at step b2, the terminal B initiates a second round of ranging, to calculate the going there and back lengths of time Tround2 and Treply2 of the second round of ranging signal;
at step b3, the TOF is calculated: TOF=Tprop=(Tround1× Tround2−Treply1×Treply2)/(Tround1+Tround2+ Treply1+Treply2).

Figure 8:
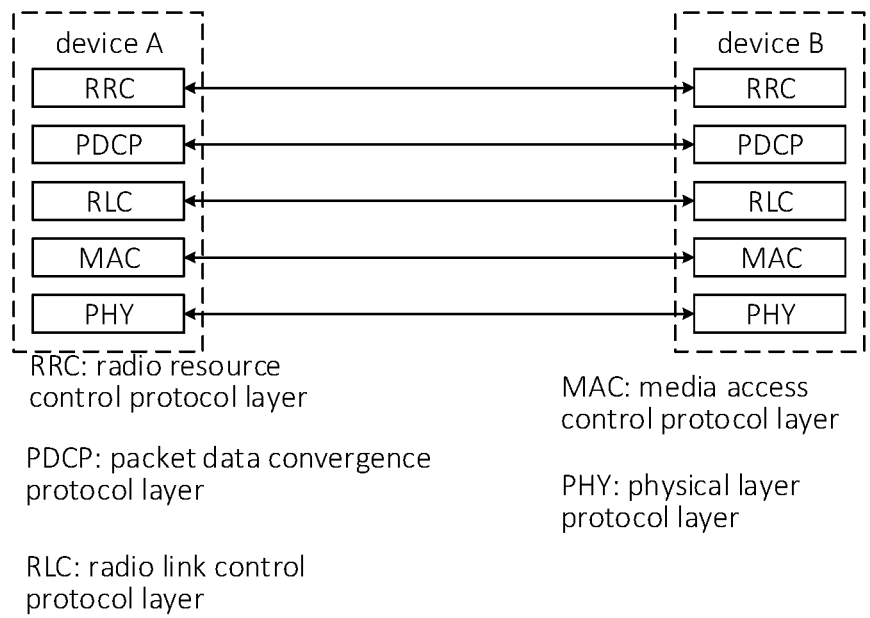
FIG. 8 illustrates a Radio Resource Control (RRC) protocol stack according to some embodiments.
Figure 9:
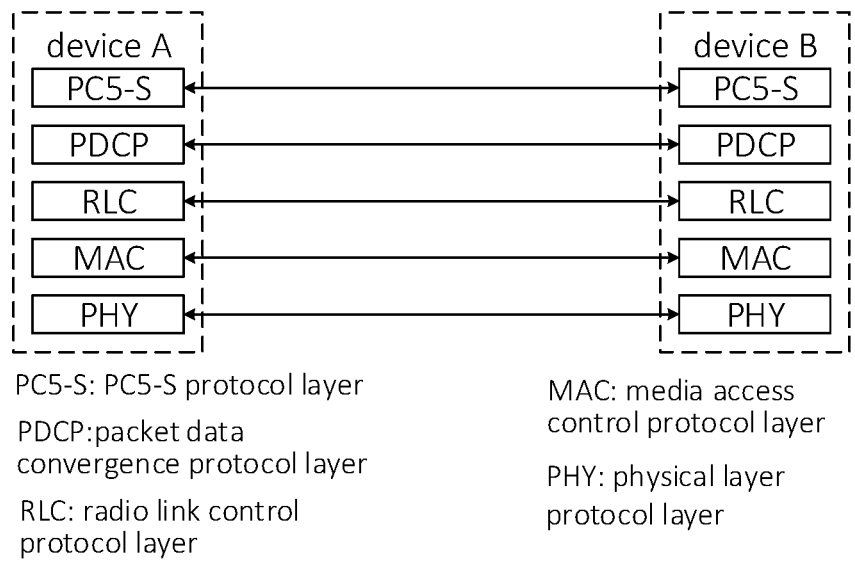
FIG. 9 illustrates the PC5-signalling protocol stack according to some embodiments.

A sidelink interface between terminals is referred to as a PC5 interface. A sidelink control plane supports two protocols: a PC5-Signalling protocol and a Radio Resource Control (RRC) protocol. FIG. 8 illustrates an RRC protocol stack, including an RRC protocol layer, a Packet Data Convergence Protocol (PDCP) layer, a Radio Link Control (RLC) protocol layer, a Media Access Control (MAC) protocol layer and a Physical Layer (PHY) protocol layer. FIG. 9 illustrates the PC5-signalling protocol stack, including: a PC5-S protocol layer, a Packet Data Convergence Protocol (PDCP) layer, a Radio Link Control (RLC) protocol layer, a Media Access Control (MAC) protocol layer and a Physical Layer (PHY) protocol layer. The PC5-S protocol stack may be used as a ranging layer.

Figure 10:
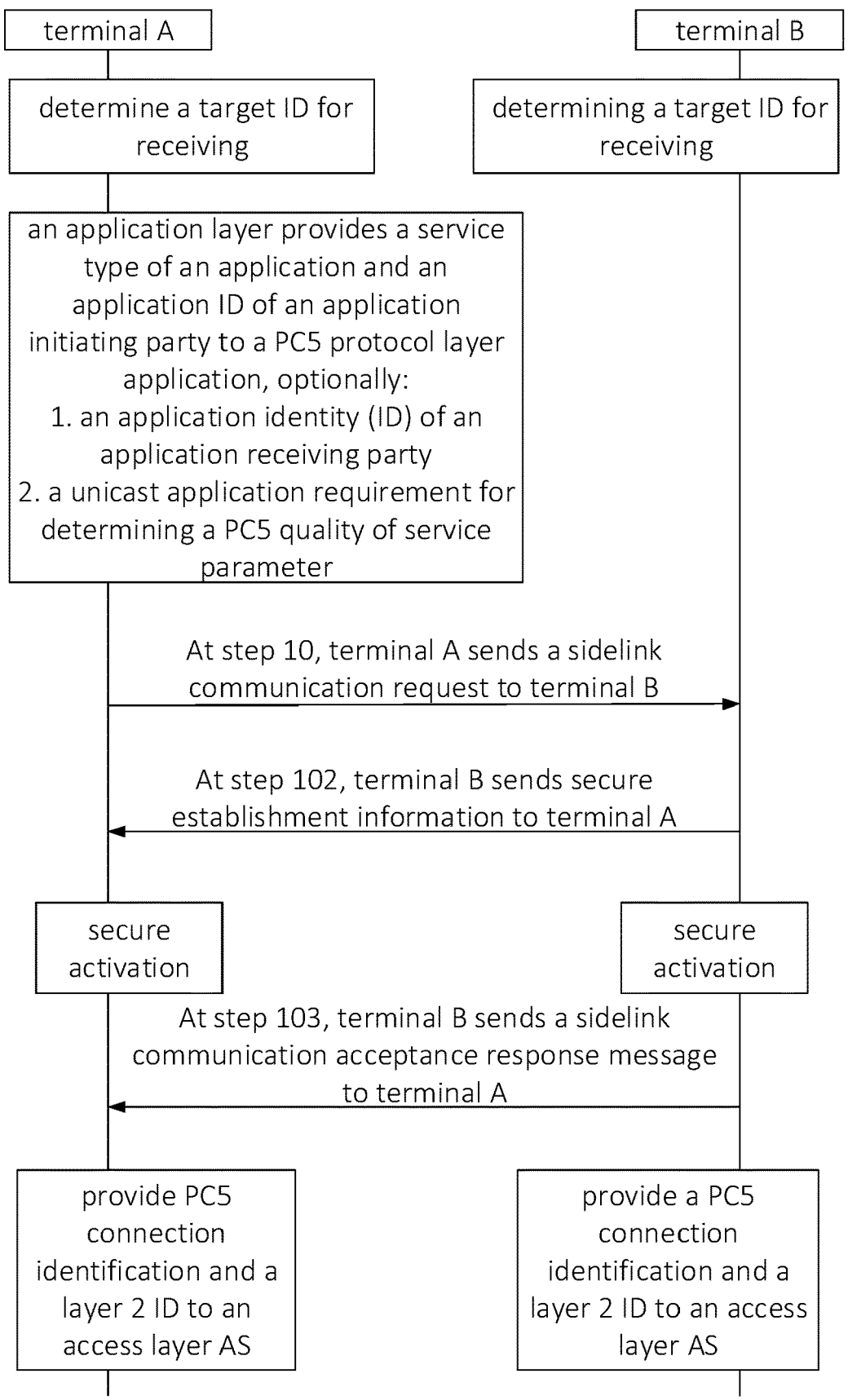
FIG. 10 is a flowchart illustrating a method for relative positioning according to some embodiments.

In an embodiment, the PC5 interface supports broadcast, multicast and unicast modes. The unicast mode needs establishing a PC5 unicast connection. As illustrated in FIG. 10, in an embodiment, a process of establishing the PC5 unicast connection includes the following steps.

At step c1, a terminal A sends a sidelink communication request to a terminal B.

At step c2, the terminal B sends secure establishment information to the terminal B.

At step c3, the terminal B sends a sidelink communication acceptance response message to the terminal A.

Figure 11:
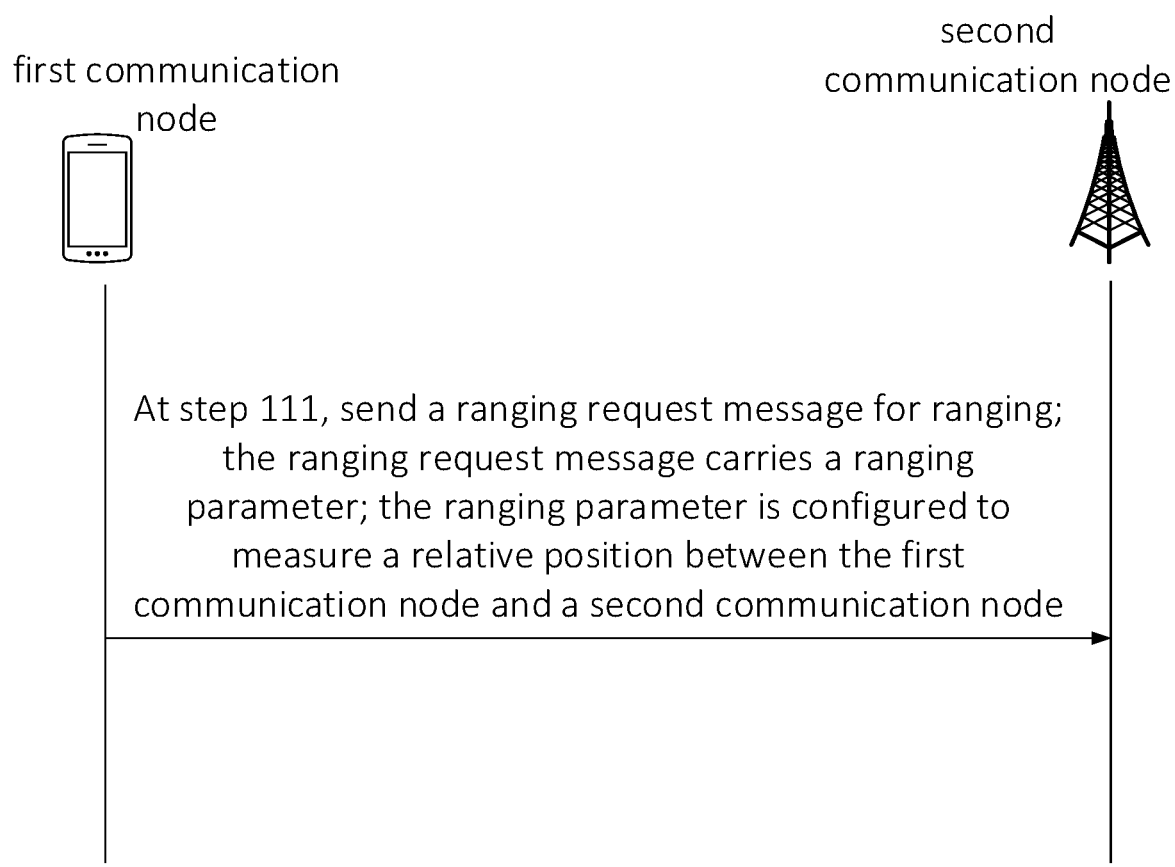
FIG. 11 is a flowchart illustrating a method for relative positioning according to some embodiments.

As illustrated in FIG. 11, embodiments provide a ranging method performed by a first communication node. The method includes the following steps.

At step 111, a ranging request message for ranging is sent.

The ranging request message carries a ranging parameter. The ranging parameter is configured to measure a relative position between the first communication node and a second communication node.

In an embodiment, the first communication node and/or the second communication node may be a terminal. The terminal may be, but is not limited to, a mobile phone, a wearable device, a vehicle-mounted terminal, a Road Side Unit (RSU), a smart home terminal, an industrial sensing device and/or a medical device.

In an embodiment, the first communication node and/or the second communication node may be a base station. The base station may be an interface device for the terminal to access a network. The base station may be any type of base station, such as, a 3G base station, a 4G base station, a 5G base station or other evolutionary base station.

In an embodiment, the first communication node and/or the second communication node may be a communication node on the network side, such as an Access Control And Mobility Management Function (AMF) entity and a Policy Control Function (PCF) entity in the 5G network.

Figure 12:
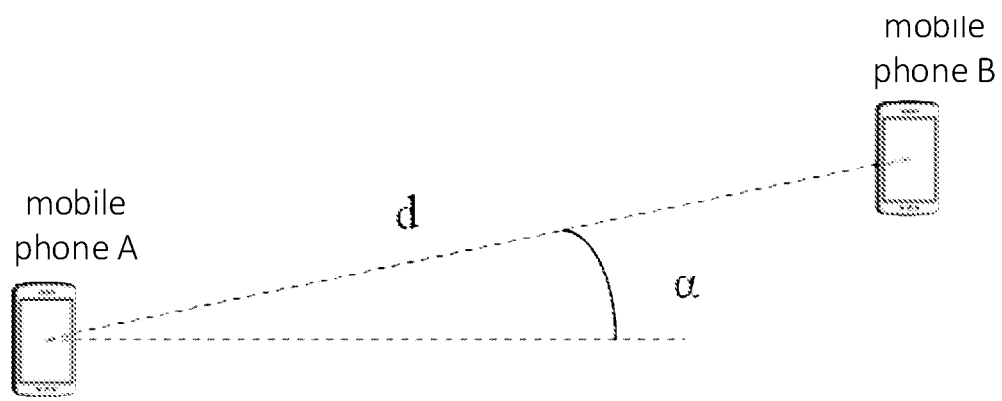
FIG. 12 is a schematic diagram illustrating a method for relative positioning according to some embodiments.

In an embodiment, the ranging may be measuring a relative position between the first communication node and the second communication node using a ranging parameter. In an embodiment, measuring the relative position between the first communication node and the second communication node may be measuring a distance between the first communication node and the second communication node and/or measuring an azimuth angle of the second communication node relative to the first communication node. For example, as illustrated in FIG. 12, the first communication node is a mobile phone A, and the second communication node is a mobile phone B. Measuring the relative position between the mobile phone A and the mobile phone B may be measuring a distance d between the mobile phone A and the mobile phone B and an azimuth angle α of the mobile phone B relative to the mobile phone A. The azimuth angle α may be an Angle Of Arrival (AOA) or an Angle Of Departure (AOD).

In an embodiment, as illustrated in FIG. 12, the mobile phone A may determine the relative position of the mobile phone B relative to the mobile phone A by obtaining the relative distance d of the mobile phone A relative to the mobile phone B and the AOA α that the signal sent by the mobile phone B arrives at the mobile phone A. In an embodiment, it is also possible that the mobile phone A may determine a relative position of the mobile phone B relative to the mobile phone A by obtaining the relative distance of the mobile phone A relative to the mobile phone B and the AOD α that the signal sent by the mobile phone A departs from the mobile phone A.

In an embodiment, the relative position between the first communication node and the second communication node may be measured using a wireless communication mode, such as sidelink.

In an embodiment, as illustrated in FIG. 12, the first communication node is a terminal A, and the second communication node is a terminal B. In performing the relative positioning between the terminal A and the terminal B, based on the sidelink, the terminal A sends an initial ranging signal, the terminal B feeds back a feedback ranging signal after receiving the initial ranging signal, the terminal A calculates the relative distance d between the terminal A and the terminal B based on the time difference between the time of sending the initial ranging signal and the time of receiving the feedback ranging signal, and the terminal A calculates the relative angle α by measuring the AOA of the feedback ranging signal. Therefore, the relative positioning between the terminal A and the terminal B is performed based on the relative distance d and the relative angle α to determine the relative position between the terminal A and the terminal B.

In an embodiment, the ranging request message for ranging is sent to the second communication node in response to determining that the first communication node needs to initiate the ranging. The second communication node may perform the ranging based on the ranging parameter carried in the ranging request message after receiving the ranging request message. In an embodiment, when an application for ranging in the terminal is started, the ranging request message is sent to the second communication node. In another embodiment, when the terminal receives an instruction for triggering the ranging from the user, the ranging request message is sent to the second communication node.

In an embodiment, the ranging parameter includes at least one of:
 a security requirement indication, configured to indicate that a secure connection is required for the ranging or a secure connection is not required for the ranging;
 a ranging precision;
 a ranging range;
 a ranging object, including a distance and/or an angle;
 a first application layer identity authorized by an application layer of the first communication node, configured to indicate an application layer identity of a communication node capable of initiating the ranging to the application layer;
 a validity period of the first application layer identity;
 a second application layer identity authorized by an application layer, configured to indicate an application layer identity of a communication node capable of supporting, as a target communication node, the application layer to initiate the ranging;
 a validity period of the second application layer identity; or
 an indication of a ranging method, in which the ranging method includes a single-sided ranging method and a double-sided ranging method. The single-sided ranging method is a method with which one communication node in both ranging parties sends a ranging signal to perform the ranging; and the double-sided ranging method is a method with which both ranging parties send ranging signals to perform the ranging.

In an embodiment, the ranging services may be classified, based on different service features, as different service types, such as a service type requiring security protection that the service feature needs the security protection and a service type requiring privacy protection that the service feature needs the privacy protection. Here, the security protection means protecting the data from being leaked or tampered during data transmission. The privacy protection means protecting the identity information from being leaked during data transmission.

In an embodiment, when the service type of a service is the service type requiring security protection and/or privacy protection, the security requirement indication may indicate that the secure connection is required for the ranging of the service. For example, when the service type is the service type requiring security protection, the security requirement indication may indicate that a secure unicast connection established based on a PC5 interface is adopted for the ranging of the service. In this way, when the service type is the service type requiring security protection and/or privacy protection, data transmission security can be ensured and privacy information leakage may be avoided.

In an embodiment, when a service does not require the security protection and/or the privacy protection, the security requirement indication may indicate that the ranging is performed based on a connection other than the secure connection.

In an embodiment, the secure connection may be a connection that has introduced an encryption mechanism during or after the establishment of the connection.

In an embodiment, the established connection is the PC5 secure unicast connection. During the establishment of the PC5 secure unicast connection, as illustrated in step c2 of FIG. 10, after the terminal B sends secure establishment information to the terminal A, both the terminal A and the terminal B may activate the encryption mechanism. Therefore, after the PC5 secure unicast connection is successfully established, when the terminal A and the terminal B perform wireless communication about the ranging using the established PC5 secure unicast connection, the data used for the ranging transmitted between the terminal A and the terminal B may be encrypted, to ensure that the transmitted data for the ranging cannot be leaked or tampered.

In another embodiment, the established connection is the PC5 secure unicast connection. After the PC5 secure unicast connection is successfully established, the terminal A and the terminal B may activate the encryption mechanism. When the terminal A and the terminal B perform wireless communication about the ranging using the established PC5 secure unicast connection, the data for the ranging transmitted between the terminal A the terminal B may be encrypted, to protect the transmitted data used for the ranging from being leaked or tampered.

In an embodiment, the encryption mechanism may be a mechanism that encrypts all data used in the whole ranging process for the ranging.

Alternatively, the encryption mechanism may also be a mechanism that encrypts part of data used in the ranging process for the ranging. For example, the encryption mechanism may be a mechanism that only encrypts data involving identity privacy information used in a ranging process for the ranging.

In an embodiment, the ranging precision may be a precision level. Performing the ranging with different precision levels can obtain ranging data with different precisions. The higher the precision level is, the higher the precision of the data obtained is. For example, an error between the ranging data obtained with a first precision level and actual data is less than a; and an error of the ranging data obtained with a second precision level and actual data are less than b, where a<b. The first precision level is higher than the second precision level.

In an embodiment, when the precision required by a ranging service is greater than a preset precision threshold, a precision level greater than a level threshold is adopted. When the precision required by a ranging service is less than the preset precision threshold, a precision level less than the level threshold is adopted.

In an embodiment, precisions of the ranging data obtained within different precision ranges are different. The higher the precisions corresponding to the precision range adopted are, the higher the precision of the obtained ranging data is. For example, when the first precision range is [c, d] and the second precision range is [e, f], where c>f, the precision of the ranging data obtained with a precision within the first precision range is higher than the precision of the ranging data obtained with a precision within the second precision range.

In an embodiment, when needing to obtain a relative distance relationship between the second communication node and the first communication node, the ranging object is the distance. When needing to obtain a relative angle relationship of the second communication node relative to the first communication node, the ranging object is the angle. When needing to obtain both the relative distance relationship between the second communication node and the first communication node and the relative angle relationship of the second communication node relative to the first communication node, the ranging objects include the distance and the angle.

In an embodiment, there may be more than one first application layer identity authorized by the application layer of the first communication node. In an embodiment, the second communication node is capable of initiating the ranging to the application layer of the first communication node, in response to the application layer identity of the second communication node being the first application layer identity. The second communication node is incapable of initiating the ranging to the application layer of the first communication node, in response to the application layer identity of the second communication node not being the first application layer identity.

In an embodiment, there may be more than one second application layer identity authorized by the application layer of the first communication node. In an embodiment, the second communication node is capable of receiving, as a target communication node, a ranging request sent by the first communication node, in response to the application layer identity of the second communication node being the second application layer identity. The second communication node is incapable of receiving, as a target communication node, a ranging request sent by the first communication node, in response to the application layer identity of the second communication node not being the second application layer identity.

In an embodiment, the validity period of the first application layer identity and the validity period of the second application layer identity may include respective validity time points and respective invalidity time points. For example, the validity time point is 12:30; and the invalidity time point is 14:30.

In another embodiment, the validity period of the first application layer identity and the validity period of the second application layer identity may include respective validity time points and respective validity durations. For example, the validity time point is 12:30; and the validity duration is 2 hours.

In an embodiment, when a latency required by a ranging service of the first communication node is less than a latency threshold, the indication of the ranging method may indicate to perform the ranging of the single-sided ranging method. When a latency required by a ranging service of the terminal is greater than the latency threshold, the indication of the ranging method may indicate to perform the ranging of the double-sided ranging method.

In an embodiment, when an error required by a ranging service of the first communication node is less than an error threshold, the indication of the ranging method may indicate to perform the ranging of the double-sided ranging method. When an error required by a ranging service of the terminal is greater than the error threshold, the indication of the ranging method may indicate to perform the ranging of the single-sided ranging method.

In embodiments of the disclosure, the second communication node may perform the ranging based on the ranging parameter carried in the ranging request message and measure a relative position between the first communication node and the second communication node after receiving the ranging request message sent by the first communication node. Therefore, the second communication node may perform the ranging based on an indication of the ranging parameter sent by the first communication node, which is more adaptive to the ranging requirement of the first communication node compared with performing the ranging based on a fixed ranging parameter.

Figure 13:
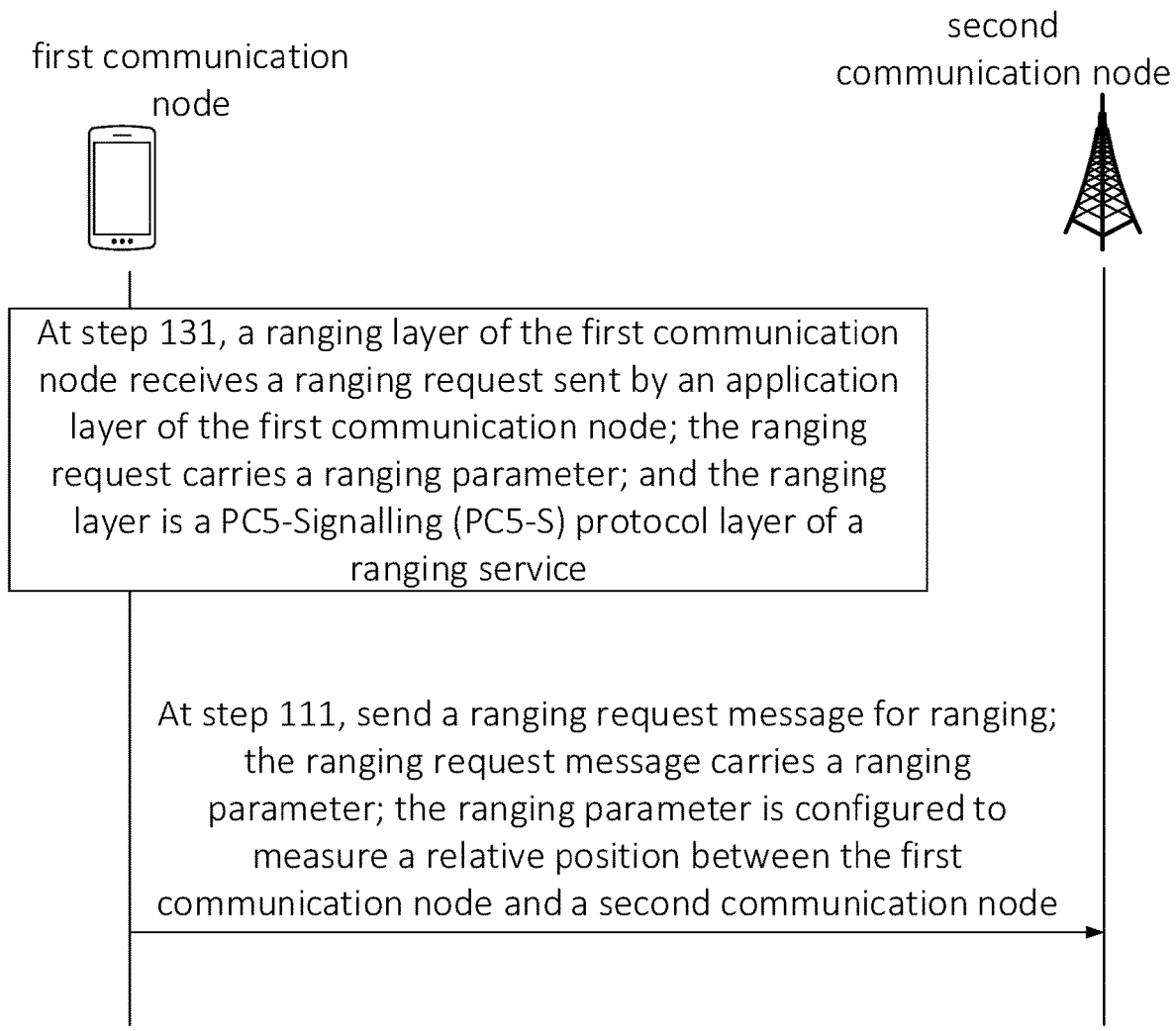
FIG. 13 is a flowchart illustrating a method for relative positioning according to some embodiments.

As illustrated in FIG. 13, the ranging method according to embodiments further includes the following steps.

At step 131, a ranging layer of the first communication node receives a ranging request sent by an application layer of the first communication node. The ranging request carries a ranging parameter. The ranging layer is a PC5-Signalling (PC5-S) protocol layer of a ranging service.

In an embodiment, the ranging layer of the first communication node receives the ranging request sent by the application layer of the first communication node, in response to determining that there is a ranging requirement in a ranging application in the first communication node. Here, there is the ranging requirement in the ranging application in the first communication node, in response to launching the ranging application in the first communication node.

In an embodiment, the ranging parameter carried in the ranging request includes at least one of:
  a security requirement indication, configured to indicate that a secure connection is required for the ranging or a secure connection is not required for the ranging;
  a ranging precision;
  a ranging range;
  a ranging object, including a distance and/or an angle;
  a first application layer identity authorized by an application layer of the first communication node, configured to indicate an application layer identity of a communication node capable of initiating the ranging to the application layer;
  a validity period of the first application layer identity;

a second application layer identity authorized by an application layer, configured to indicate an application layer identity of a communication node capable of supporting, as a target communication node, the application layer to initiate the ranging;

a validity period of the second application layer identity; or an indication of a ranging method, in which the ranging method includes a single-sided ranging method and a double-sided ranging method. The single-sided ranging method is a method with which one communication node in two ranging parties sends a ranging signal to perform the ranging; and the double-sided ranging method is a method with which both ranging parties send ranging signals to perform the ranging.

Figure 14:
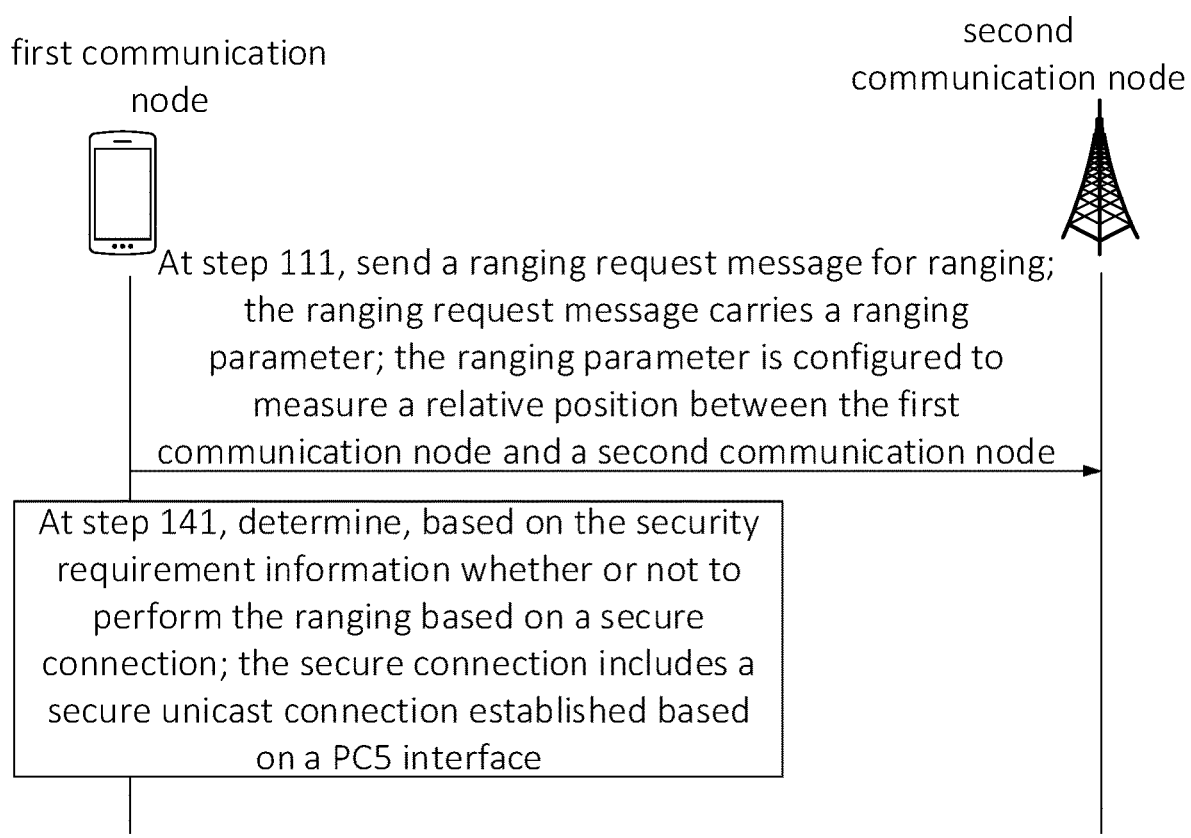
FIG. 14 is a flowchart illustrating a method for relative positioning according to some embodiments.

As illustrated in FIG. 14, in a ranging method according to embodiments, the ranging parameter includes security requirement information. The method further includes the following steps.

At step 141, it is determined, based on the security requirement information, whether or not to perform the ranging based on a secure connection. The secure connection can be a secure unicast connection established based on a PC5 interface.

In an embodiment, the ranging services may be classified, based on different service features, as different service types, such as a service type requiring security protection that the service feature needs the security protection and a service type requiring privacy protection that the service feature needs the privacy protection. Here, the security protection means protecting the data from being leaked or tampered during data transmission. The privacy protection means protecting the identity information from being leaked during data transmission.

In an embodiment, when the service type of a service is the service type requiring security protection and/or privacy protection, the security requirement indication may indicate that the secure connection is required for the ranging of the service. In this way, when the service type is the service type requiring security protection and/or privacy protection, data transmission security can be ensured and privacy information leakage may be avoided.

In an embodiment, when the security requirement information indicates that the secure connection is required for the ranging of the service, the ranging is performed based on the secure connection. When the security requirement information indicates that the secure connection is not required for the ranging of the service, the ranging is performed based on other connections rather than the secure connection.

In an embodiment, the secure connection may be a connection that has introduced an encryption mechanism during or after the establishment of the connection. In an embodiment, the encryption mechanism may be a mechanism that encrypts all data used in the whole ranging process for the ranging. In another embodiment, the encryption mechanism also may be a mechanism that encrypts part of data used in the ranging process for the ranging. For example, the encryption mechanism may be a mechanism that only encrypts data involving identity privacy information used in the ranging process for the ranging.

In an embodiment, the secure connection may be an RRC connection that has introduced the encryption mechanism. In an embodiment, the secure connection may also be a PC5 connection that has introduced the encryption mechanism.

In an embodiment, as illustrated in FIG. 10, the secure unicast connection established based on the PC5 interface may be a unicast connection established based on the PC5 interface that has introduced the encryption mechanism.

Figure 15:
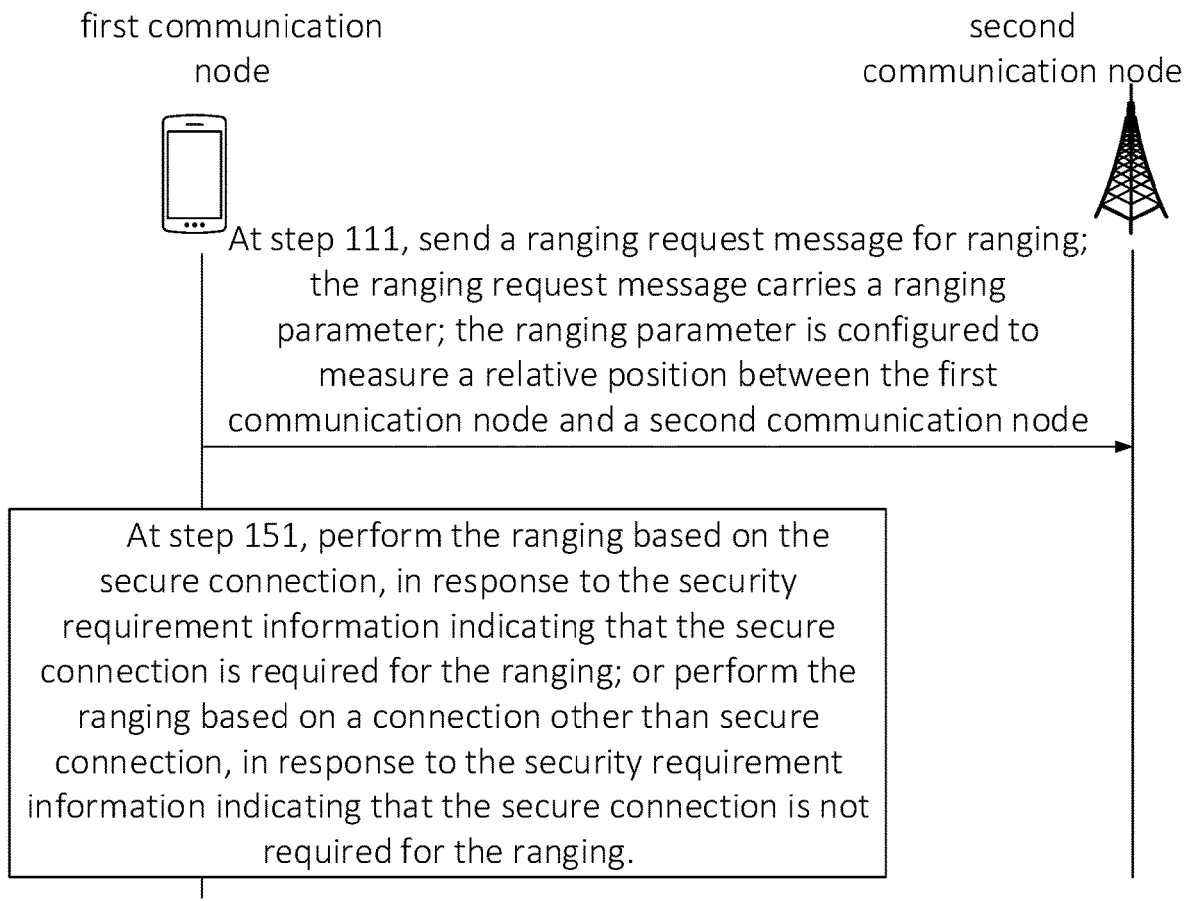
FIG. 15 is a flowchart illustrating a method for relative positioning according to some embodiments.

As illustrated in FIG. 15, in the ranging method is according to the embodiments. The step 131 of determining, based on the security requirement information, whether or not to perform the ranging based on the secure connection includes the following steps.

At step 151, it is determined to perform the ranging based on the secure connection, in response to the security requirement information indicating that the secure connection is required for the ranging; or, it is determined to perform the ranging based on a connection other than secure connection, in response to the security requirement information indicating that the secure connection is not required for the ranging.

In an embodiment, when the service type of a service is the service type requiring security protection and/or privacy protection, the security requirement indication is a first indication, and the first indication indicates that the secure connection is required for the ranging of the service. The first communication node may determine to perform the ranging based on the secure connection after receiving the first indication. When the service type of a service is the service type that does not need the security protection and the privacy protection, the security requirement indication is a second indication, and the second indication indicates that the secure connection is not required for the ranging of the service. The first communication node may determine to perform the ranging based on a connection other than the secure connection after receiving the second indication.

In an embodiment, the connection other than the secure connection includes:

a broadcast connection;

a multicast connection; or a unicast connection that does not use an encryption mechanism for ranging transmission.

In an embodiment, the broadcast connection enables one source communication node to simultaneously send the same data to more than one target communication node. The multicast connection enables one source communication node to simultaneously send the same data to more than one target communication node within the same group.

In an embodiment, the unicast connection that does not use the encryption mechanism for ranging transmission may be a unicast connection established based on a PC5 interface and not using the encryption mechanism for the ranging transmission.

In an embodiment, not using the encryption mechanism means using a mechanism that does not encrypt the data used for the ranging in the ranging process.

In an embodiment, the secure unicast connection includes:

a unicast connection using an encryption mechanism for the ranging transmission.

The unicast connection using the encryption mechanism for the ranging transmission may be a connection that has introduced the encryption mechanism during or after the establishment of the connection. In an embodiment, the encryption mechanism may be a mechanism that encrypts all data used in the whole ranging process for the ranging. In another embodiment, the encryption mechanism also may be a mechanism that encrypts part of data used in the ranging process for the ranging. For example, the encryption mechanism may be a mechanism that only encrypts data involving identity privacy information used in the ranging process for the ranging.

In an embodiment, the ranging request message further carries an application layer identity of the first communication node and/or an application layer identity of the second communication node.

In an embodiment, the second communication node may determine whether the application layer identity of the first communication node is an application layer identity of a communication node capable of initiating the ranging to the application layer of the second communication node after receiving the ranging request message carrying the application layer identity of the first communication node. If the second communication node determines that the application layer identity of the first communication node is the application layer identity of the communication node capable of initiating the ranging to the application layer of the second communication node, the ranging request message may be responded to. If the application layer identity of the first communication node is not the application layer identity of the communication node capable of initiating the ranging to the application layer of the second communication node, the ranging request message is directly ignored.

In an embodiment, the target communication node may determine whether the application layer identity of the second communication node is an application layer identity of a communication node capable of initiating the ranging to the application layer of the target communication node after receiving the ranging request message carrying the application layer identity of the second communication node. If the application layer identity of the second communication node is the application layer identity of the communication node capable of initiating the ranging to the application layer of the target communication node, the ranging request message may be responded to. If the application layer identity of the second communication node is not the application layer identity of the communication node capable of initiating the ranging to the application layer of the target communication node, the ranging request message is directly ignored.

Figure 16:
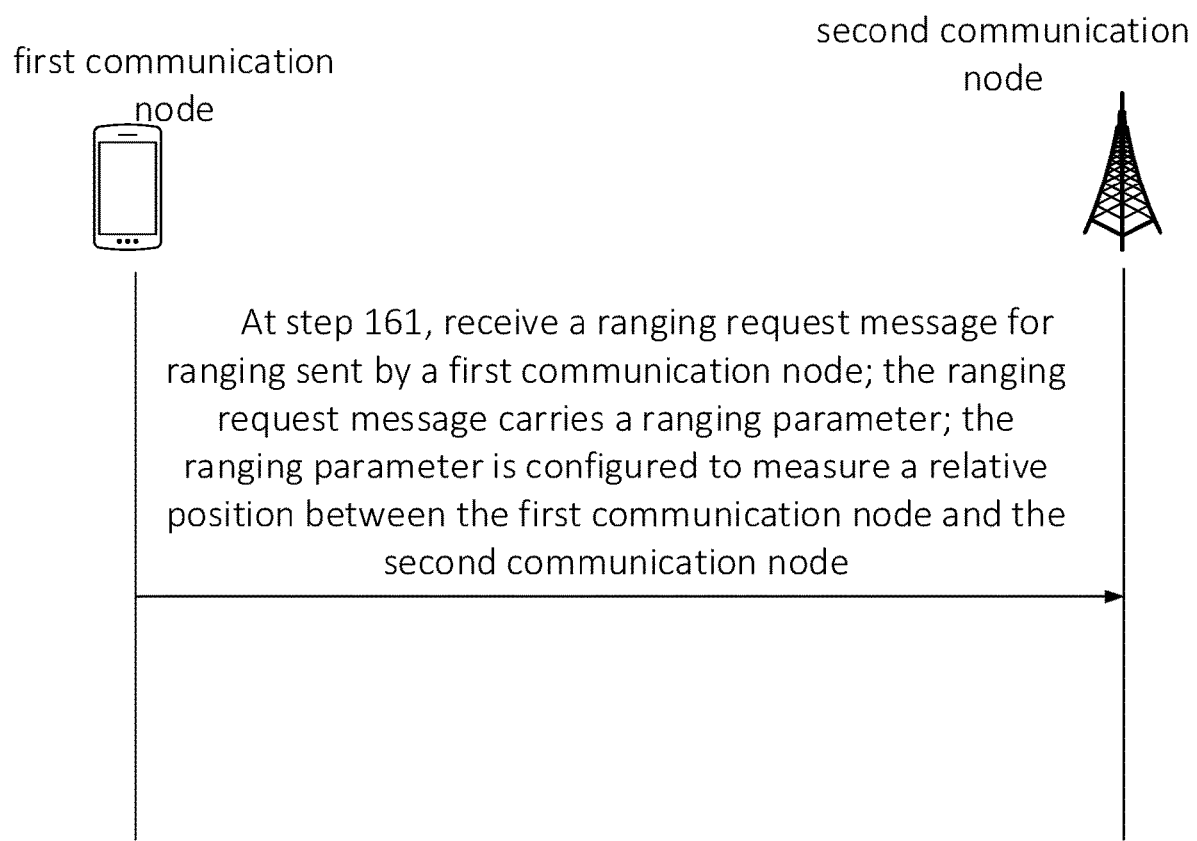
FIG. 16 is a flowchart illustrating a method for relative positioning according to some embodiments.

As illustrated in FIG. 16, embodiments provide a ranging method performed by a second communication node. The method includes the following steps.

At step 161, a ranging request message for ranging sent by a first communication node is received.

The ranging request message carries a ranging parameter. The ranging parameter is configured to measure a relative position between the first communication node and the second communication node.

In an embodiment, the first communication node and/or the second communication node may be a terminal. The terminal may be, but is not limited to, a mobile phone, a wearable device, a vehicle-mounted terminal, a Road Side Unit (RSU), a smart home terminal, an industrial sensing device and/or a medical device.

In an embodiment, the first communication node and/or the second communication node may be a base station. The base station may be an interface device for the terminal to access a network. The base station may be any type of base station, such as a 3G base station, a 4G base station, a 5G base station or other evolutionary base station.

In an embodiment, the first communication node and/or the second communication node may be a communication node on the network side, such as, an Access Control And Mobility Management Function (AMF) entity and a Policy Control Function (PCF) entity in the 5G network.

In an embodiment, the ranging may be measuring a relative position between the first communication node and a second communication node using a ranging parameter. In an embodiment, measuring the relative position between the first communication node and the second communication node may be measuring a distance between the first communication node and the second communication node and/or measuring an azimuth angle of the second communication node relative to the first communication node. For example, as illustrated in FIG. 12, the first communication node is a mobile phone A, and the second communication node is a mobile phone B. Measuring the relative position between the mobile phone A and the mobile phone B may be measuring a distance d between the mobile phone A and the mobile phone B and an azimuth angle $\alpha$ of the mobile phone B relative to the mobile phone A. The azimuth angle $\alpha$ may be an angle of arrival (AOA) or an angle of departure (AOD).

In an embodiment, as illustrated in FIG. 12, the mobile phone A may determine the relative position of the mobile phone B relative to the mobile phone A by obtaining the relative distance d of the mobile phone A relative to the mobile phone B and the AOA $\alpha$ that the signal sent by the mobile phone B arrives at the mobile phone A. In an embodiment, it is also possible that the mobile phone A may determine a relative position of the mobile phone B relative to the mobile phone A by obtaining the relative distance of the mobile phone A relative to the mobile phone B and the AOD $\alpha$ that the signal sent by the mobile phone A departs from the mobile phone A.

In an embodiment, the relative position between the first communication node and the second communication node may be measured using a wireless communication mode, such as a sidelink.

In an embodiment, as illustrated in FIG. 12, the first communication node is a terminal A, and the second communication node is a terminal B. In performing the relative positioning between the terminal A and the terminal B, based on the sidelink, the terminal A sends an initial ranging signal, the terminal B feeds back a feedback ranging signal after receiving the initial ranging signal, the terminal A calculates the relative distance d between the terminal A and the terminal B based on the time difference between the time of sending the initial ranging signal and the time of receiving the feedback ranging signal, and the terminal A calculates the relative angle $\alpha$ by measuring an AOA of the feedback ranging signal. Therefore, the relative positioning between the terminal A and the terminal B is performed based on the relative distance d and the relative angle $\alpha$, to determine the relative position between the terminal A and the terminal B.

In an embodiment, the ranging request message for ranging is sent to the second communication node in response to determining that the first communication node needs to initiate the ranging. The second communication node may perform the ranging based on the ranging parameter carried in the ranging request message after receiving the ranging request message. In an embodiment, when an application for ranging in the terminal is started, the ranging request message is sent to the second communication node. In another embodiment, when the terminal receives an instruction for triggering the ranging from the user, the ranging request message is sent to the second communication node.

In an embodiment, the ranging parameter includes at least one of:
  a security requirement indication, configured to indicate that a secure connection is required for the ranging or a secure connection is not required for the ranging;
  a ranging precision;
  a ranging range;
  a ranging object, including a distance and/or an angle;

a first application layer identity authorized by an application layer of the first communication node, configured to indicate an application layer identity of a communication node capable of initiating the ranging to the application layer;

a validity period of the first application layer identity;

a second application layer identity authorized by an application layer, configured to indicate an application layer identity of a communication node capable of supporting, as a target communication node, the application layer to initiate the ranging;

a validity period of the second application layer identity; or an indication of a ranging method, in which the ranging method includes a single-sided ranging method and a double-sided ranging method. The single-sided ranging method is a method with which one communication node in two ranging parties sends a ranging signal to perform the ranging; and the double-sided ranging method is a method with which both ranging parties send ranging signals to perform the ranging.

In an embodiment, the ranging services may be classified, based on different service features, as different service types, such as a service type requiring security protection that the service feature needs the security protection and a service type requiring privacy protection that the service feature needs the privacy protection. Here, the security protection means protecting the data from being leaked or tampered during data transmission. The privacy protection means protecting the identity information from being leaked during data transmission.

In an embodiment, when the service type of a service is the service type requiring security protection and/or privacy protection, the security requirement indication may indicate that the secure connection is required for the ranging of the service. For example, when the service type is the service type requiring security protection, the security requirement indication may indicate that a secure unicast connection established based on a PC5 interface is adopted for the ranging of the service. In this way, when the service type is the service type requiring security protection and/or privacy protection, data transmission security can be ensured and privacy information leakage may be avoided.

In an embodiment, when a service does not require the security protection and/or the privacy protection, the security requirement indication may indicate that the ranging is performed based on a connection other than the secure connection.

In an embodiment, the secure connection may be a connection that has introduced an encryption mechanism during or after the establishment of the connection.

In an embodiment, the established connection is the PC5 secure unicast connection. During the establishment of the PC5 secure unicast connection, as illustrated in step c2 of FIG. 10, after the terminal B sends secure establishment information to the terminal A, both the terminal A and the terminal B may activate the encryption mechanism. Therefore, after the PC5 secure unicast connection is successfully established, when the terminal A and the terminal B perform wireless communication about the ranging using the established PC5 secure unicast connection, the data used for the ranging transmitted between the terminal A and the terminal B may be encrypted, to ensure that the transmitted data for the ranging cannot be leaked or tampered.

In another embodiment, the established connection is the PC5 secure unicast connection. When the PC5 secure unicast connection is successfully established, the terminal A and the terminal B may activate the encryption mechanism. When the terminal A and the terminal B perform wireless communication about the ranging using the established PC5 secure unicast connection, the data for the ranging transmitted between the terminal A the terminal B may be encrypted, to protect the transmitted data used for the ranging from being leaked or tampered.

In an embodiment, the encryption mechanism may be a mechanism that encrypts all data used in the whole ranging process for the ranging. In an embodiment, the encryption mechanism may also be a mechanism that encrypts part of data used in the ranging process for the ranging. For example, the encryption mechanism may be a mechanism that only encrypts data involving identity privacy information used in a ranging process for the ranging.

In an embodiment, the ranging precision may be a precision level. Performing the ranging with different precision levels can obtain ranging data with different precisions. The higher the precision level is, the higher the precision of the data obtained is. For example, an error between the ranging data obtained with a first precision level and actual data are less than a; and an error of the ranging data obtained with a second precision level and actual data are less than b, where a<b. The first precision level is higher than the second precision level.

In an embodiment, when the precision required by a ranging service is greater than a preset precision threshold, a precision level greater than a level threshold is adopted. When the precision required by a ranging service is less than the preset precision threshold, a precision level less than the level threshold is adopted.

In an embodiment, precisions of the ranging data obtained within different precision ranges are different. The higher the precisions corresponding to the precision range adopted are, the higher the precision of the obtained ranging data is. For example, when the first precision range is [c, d], and the second precision range is [e, f], where c>f, the precision of the ranging data obtained with a precision within the first precision range is higher than the precision of the ranging data obtained with a precision within the second precision range.

In an embodiment, when needing to obtain a relative distance relationship between the second communication node and the first communication node, the ranging object is the distance. When needing to obtain a relative angle relationship of the second communication node relative to the first communication node, the ranging object is the angle. When needing to obtain the relative distance relationship between the second communication node and the first communication node and the relative angle relationship of the second communication node relative to the first communication node, the ranging objects include the distance and the angle.

In an embodiment, there may be more than one first application layer identity authorized by the application layer of the first communication node. In an embodiment, the second communication node is capable of initiating the ranging to the application layer of the first communication node, in response to the application layer identity of the second communication node being the first application layer identity. The second communication node is incapable of initiating the ranging to the application layer of the first communication node, in response to the application layer identity of the second communication node not being the first application layer identity.

In an embodiment, there may be more than one second application layer identity authorized by the application layer of the first communication node. In an embodiment, the second communication node is capable of receiving, as a target communication node, a ranging request sent by the first communication node, in response to the application layer identity of the second communication node being the second application layer identity. The second communication node is incapable of receiving, as a target communication node, a ranging request sent by the first communication node, in response to the application layer identity of the second communication node not being the second application layer identity.

In an embodiment, the validity period of the first application layer identity and the validity period of the second application layer identity may include respective validity time points and respective invalidity time points. For example, the validity time point is 12:30; and the invalidity time point is 14:30.

In an embodiment, the validity period of the first application layer identity and the validity period of the second application layer identity may include respective validity time points and respective validity durations. For example, the validity time point is 12:30; and the validity duration is 2 hours.

In an embodiment, when a latency required by a ranging service of the first communication node is less than a latency threshold, the indication of the ranging method may indicate to perform the ranging of the single-sided ranging method. When a latency required by the ranging service of the terminal is greater than the latency threshold, the indication of the ranging method may indicate to perform the ranging of the double-sided ranging method.

In an embodiment, when an error required by a ranging service of the first communication node is less than an error threshold, the indication of the ranging method may indicate to perform the ranging of the double-sided ranging method. When an error required by a ranging service of the terminal is greater than the error threshold, the indication of the ranging method may indicate to perform the ranging of the single-sided ranging method.

In embodiments of the disclosure, the second communication node may perform the ranging based on the ranging parameter carried in the ranging request message and measure a relative position between the first communication node and the second communication node after receiving the ranging request message sent by the first communication node. Therefore, the second communication node may perform the ranging based on an indication of the ranging parameter sent by the first communication node, which is more adaptive to the ranging requirement of the first communication node compared with performing the ranging based on a fixed ranging parameter.

Figure 17:
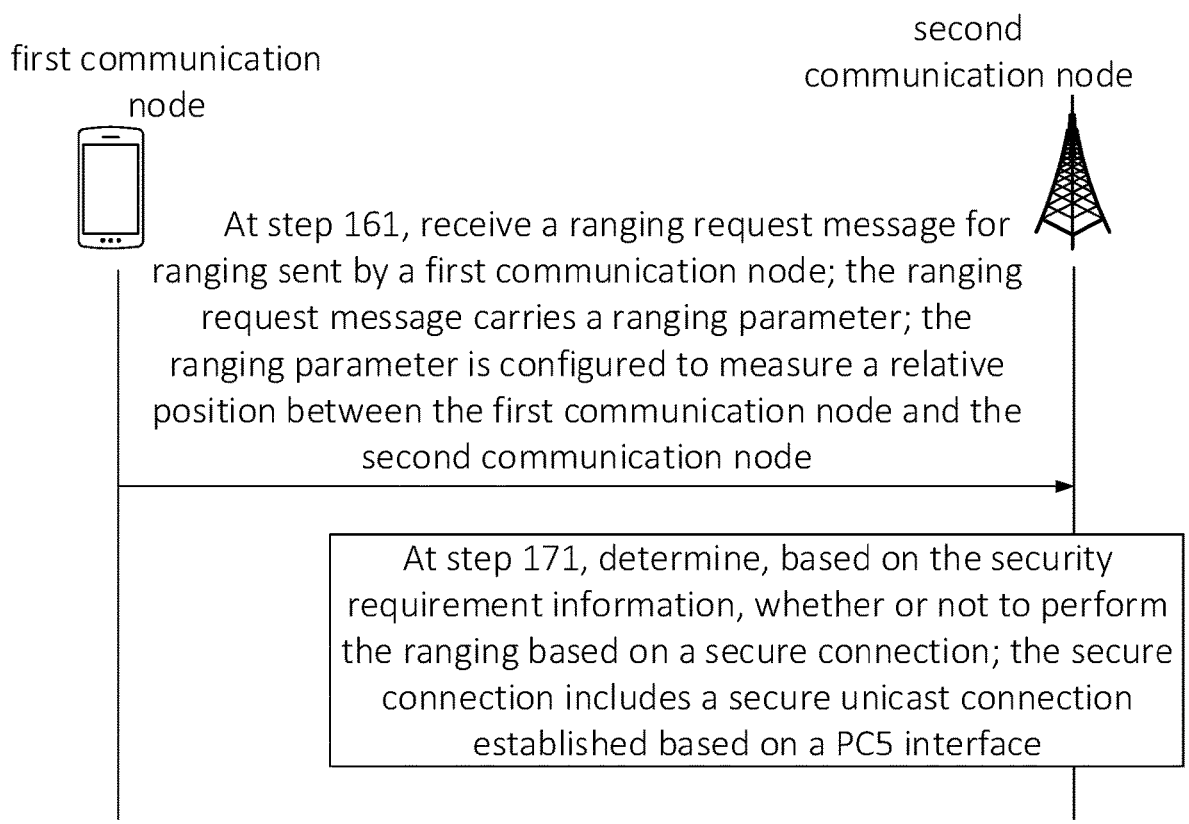
FIG. 17 is a flowchart illustrating a method for relative positioning according to some embodiments.

As illustrated in FIG. 17, in the ranging method according to embodiments, the ranging parameter includes security requirement information. The method further includes the following steps.

At step 171, it is determined, based on the security requirement information, whether or not to perform the ranging based on a secure connection. The secure connection can be a secure unicast connection established based on a PC5 interface.

In an embodiment, the ranging services may be classified, based on different service features, as different service types, such as a service type requiring security protection that the service feature needs the security protection and a service type requiring privacy protection that the service feature needs the privacy protection. Here, the security protection means protecting the data from being leaked or tampered during data transmission. The privacy protection means protecting the identity information from being leaked during data transmission.

In an embodiment, when the service type of a service is the service type requiring security protection and/or privacy protection, the security requirement indication may indicate that the secure connection is required for the ranging of the service. In this way, when the service type is the service type requiring security protection and/or privacy protection, the data transmission security can be ensured and privacy information leakage may be avoided.

In an embodiment, when the security requirement information indicates that the secure connection is required for the ranging of the service, the ranging is performed based on the secure connection. When the security requirement information indicates that the secure connection is not required for the ranging of the service, the ranging is performed based on other connections rather than the secure connection.

In an embodiment, the secure connection may be a connection that has introduced an encryption mechanism during or after the establishment of the connection. In an embodiment, the encryption mechanism may be a mechanism that encrypts all data used in the whole ranging process for the ranging. In another embodiment, the encryption mechanism may also be a mechanism that encrypts part of data used in the ranging process for the ranging. For example, the encryption mechanism may be a mechanism that only encrypts data involving identity privacy information used in the ranging process for the ranging.

In an embodiment, the secure connection may be an RRC connection that has introduced the encryption mechanism. In an embodiment, the secure connection may also be a PC5 connection that has introduced the encryption mechanism.

In an embodiment, as illustrated in FIG. 10, the secure unicast connection established based on the PC5 interface may be a unicast connection established based on the PC5 interface that has introduced the encryption mechanism.

Figure 18:
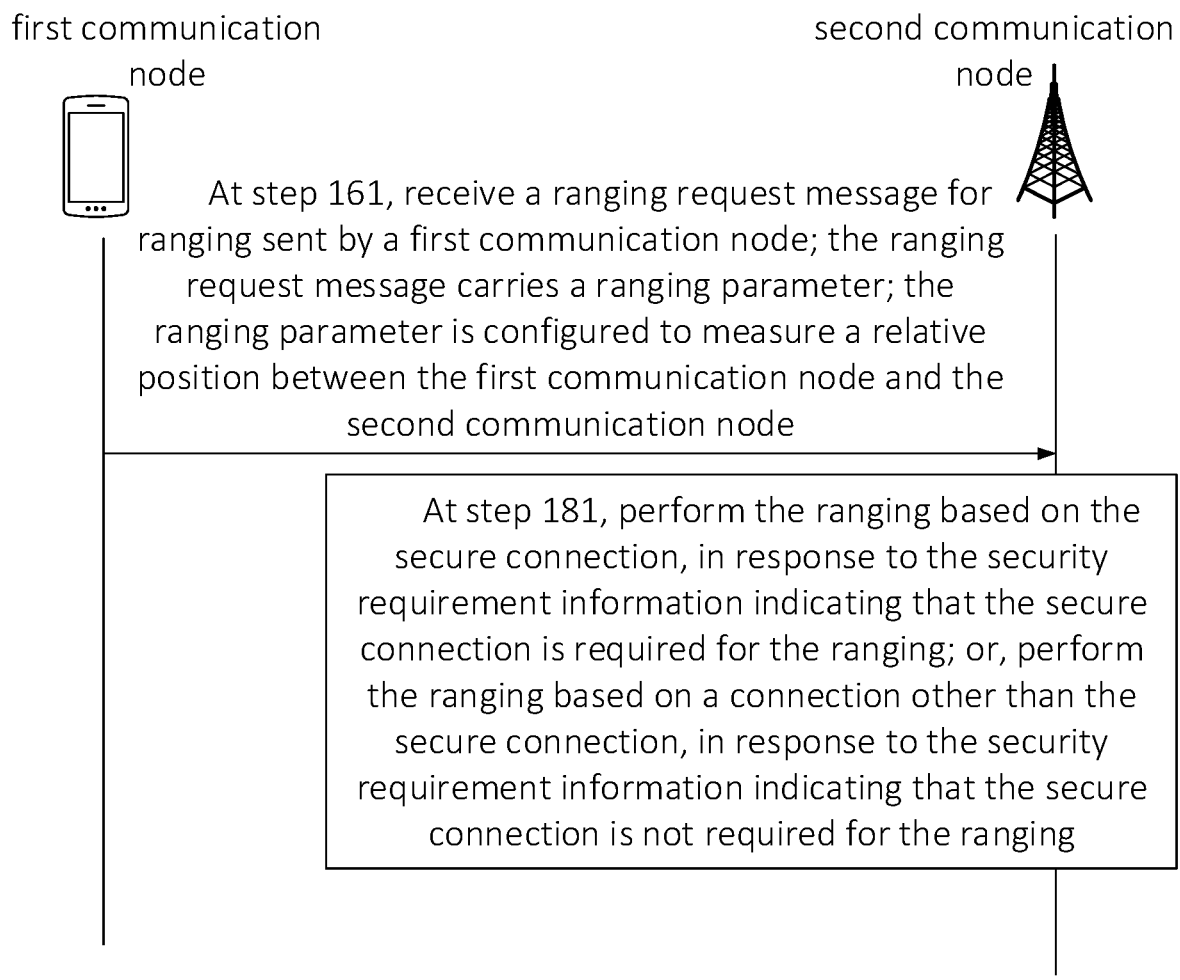
FIG. 18 is a flowchart illustrating a method for relative positioning according to some embodiments.

As illustrated in FIG. 18, in the ranging method according to embodiments, the step 161 of determining, based on the security requirement information, whether or not to perform the ranging based on the secure connection includes the following steps.

At step 181, it is determined to perform the ranging based on the secure connection, in response to the security requirement information indicating that the secure connection is required for the ranging; or, it is determined to perform the ranging based on a connection other than the secure connection, in response to the security requirement information indicating that the secure connection is not required for the ranging. The secure connection includes a secure unicast connection established based on the PC5 interface.

In an embodiment, when the service type of a service is a service type requiring security protection and/or privacy protection, the security requirement indication is a first indication, and the first indication indicates that the secure connection is required for the ranging of the service. The first communication node may determine to perform the ranging based on the secure connection after receiving the first indication. When the service type of a service is a service type that does not need the security protection and the privacy protection, the security requirement indication is a second indication, and the second indication indicates that the secure connection is not required for the ranging of the service. The first communication node may determine to perform the ranging based on a connection other than the secure connection after receiving the second indication.

In an embodiment, the connection other than the secure connection includes:
 a broadcast connection;
 a multicast connection; or
 a unicast connection that does not use an encryption mechanism for ranging transmission.

In an embodiment, the broadcast connection is a connection that enables one source communication node to simultaneously send the same data to more than one target communication node. The multicast connection is a connection that enables one source communication node to simultaneously send the same data to more than one target communication node within the same group.

In an embodiment, the unicast connection that does not use an encryption mechanism for ranging transmission may be a unicast connection established based on a PC5 interface and not using the encryption mechanism for the ranging transmission.

In an embodiment, not using the encryption mechanism means using a mechanism that does not encrypt data used for the ranging in the ranging process.

In an embodiment, the secure unicast connection includes:
 a unicast connection using an encryption mechanism for ranging transmission.

The unicast connection using an encryption mechanism for ranging transmission may be a connection that has introduced the encryption mechanism during or after the establishment of the connection. In an embodiment, the encryption mechanism may be a mechanism that encrypts all data used in the whole ranging process for the ranging. In an embodiment, the encryption mechanism may also be a mechanism that encrypts part of data used in the ranging process for the ranging. For example, the encryption mechanism may be a mechanism that only encrypts data involving identity privacy information used in the ranging process for the ranging.

Figure 19:
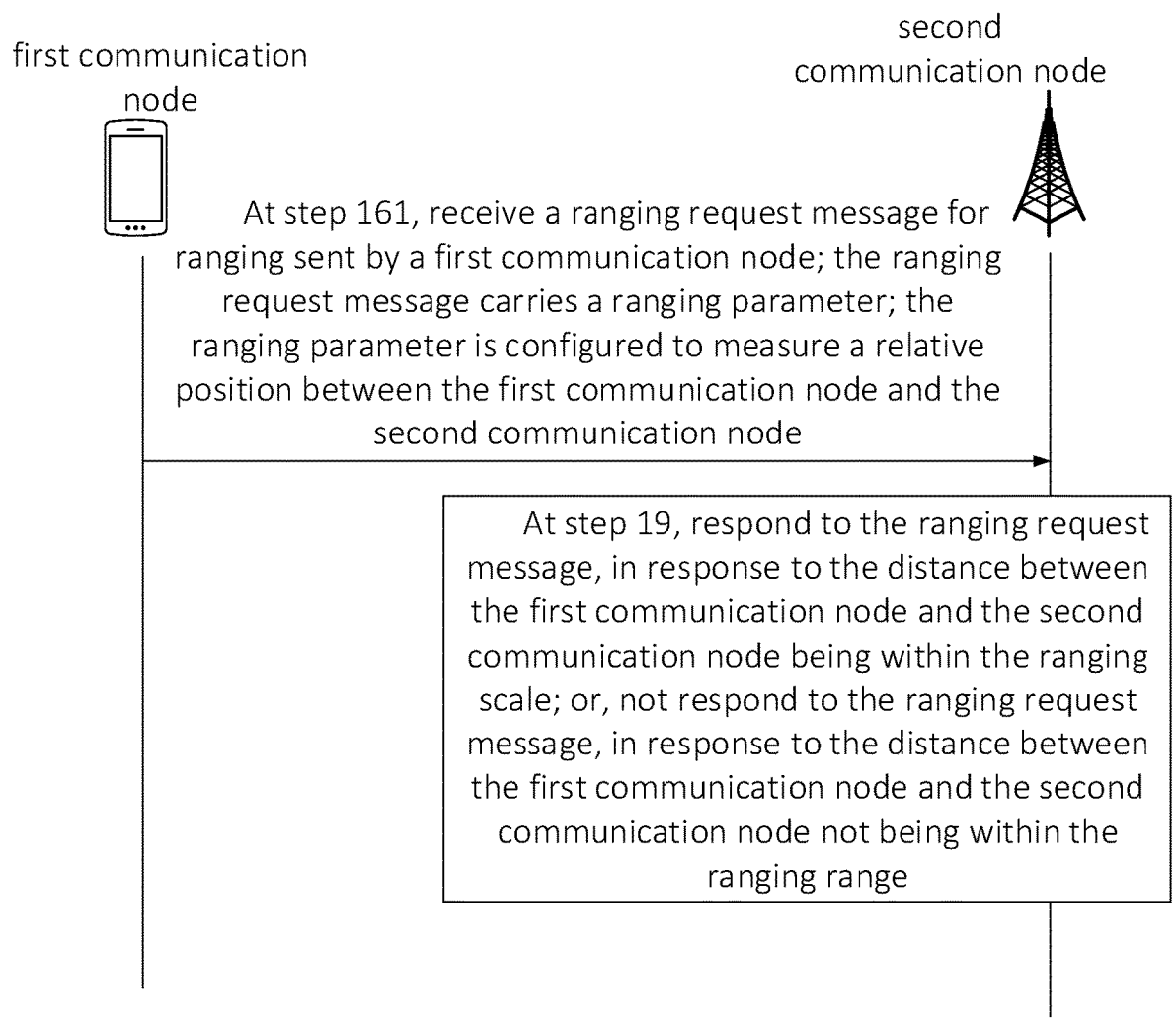
FIG. 19 is a flowchart illustrating a method for relative positioning according to some embodiments.

As illustrated in FIG. 19, in the ranging method according to the embodiments, the ranging request message carries indication information indicating the ranging range. The method further includes the following steps.

At step 19, the ranging request message is responded to, in response to the distance between the first communication node and the second communication node being within the ranging range; or, the ranging request message is not responded to, in response to the distance between the first communication node and the second communication node not being within the ranging range.

In an embodiment, the ranging range may be determined based on a transmitting power of a signal of the first communication node and/or the second communication node. The greater the transmitting power, the farther the distance that the signal propagates is and the greater the ranging range may be set. The less the transmitting power, the nearer the distance that the signal propagates is and the less the ranging range may be set. In this way, the ranging range is adaptive to the transmitting power, so that the ranging result is more accurate.

In an embodiment, in response to the transmitting power of the signal of the first communication node being greater than a signal threshold, the ranging range is set to [a, b]; and in response to the transmitting power of the signal of the first communication node being less than a signal threshold, the ranging range is set to [c, d], where a>d.

In an embodiment, the distance between the first communication node and the second communication node being within the ranging range may be that the second communication node detects that a receiving intensity of the signal of the first communication node is greater than a signal strength. The distance between the first communication node and the second communication node not being within the ranging range may be that the second communication node detects that the receiving strength of the signal of the first communication node is less than a signal strength.

In an embodiment, responding to the ranging request message may be performing the ranging based on the ranging parameter. Not responding to the ranging request message may be not performing the ranging.

Figure 20:
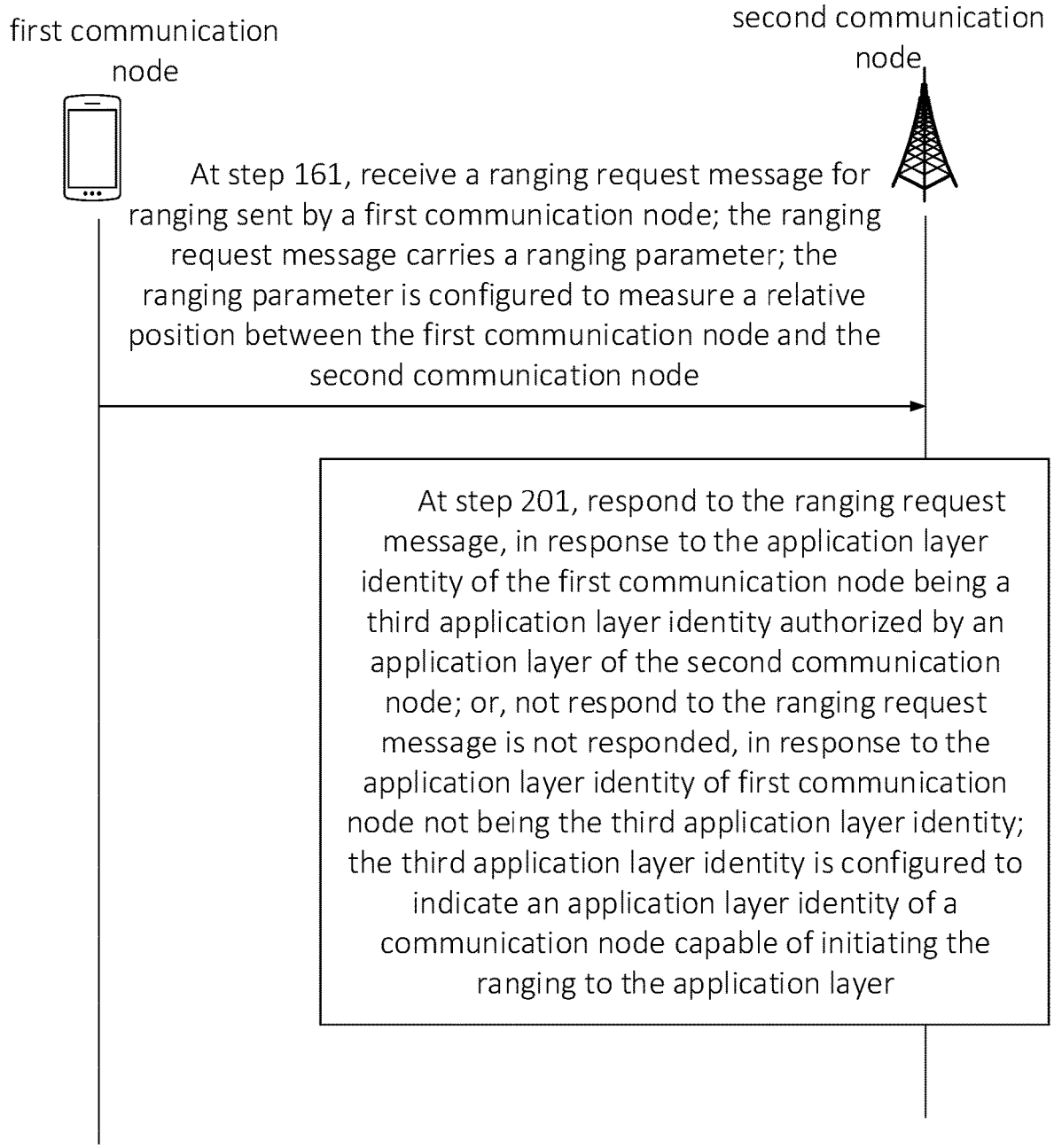
FIG. 20 is a flowchart illustrating a method for relative positioning according to some embodiments.

As illustrated in FIG. 20, in the ranging method according to embodiments, the ranging request message carries indication information indicating an application layer identity of the first communication node. The method further includes the following steps.

At step 201, the ranging request message is responded to, in response to the application layer identity of the first communication node being a third application layer identity authorized by an application layer of the second communication node; or, the ranging request message is not responded to, in response to the application layer identity of first communication node not being the third application layer identity. The third application layer identity is configured to indicate an application layer identity of a communication node capable of initiating the ranging to the application layer.

In an embodiment, the second communication nodes has a list of third application layer identities stored therein. The list includes more than one application layer identity of a communication node capable of initiating the ranging to the application layer. For example, the list includes an application layer identity of the first communication node, an application layer identity of the third communication node and an application layer identity of a fourth communication node.

In an embodiment, after receiving the ranging request message, the second communication node compares the application layer identity of the first communication node carried in the ranging request message with the third application layer identities in the list. The second communication node can respond to the ranging request message in response to the application layer identity of the first communication node being the third application layer identity authorized by the application layer of the second communication node; and the second communication node does not respond to the ranging request message in response to the application layer identity of the first communication node not being the third application layer identity authorized by the application layer of the second communication node.

In an embodiment, responding to the ranging request message may be performing the ranging based on the ranging parameter. Not responding to the ranging request message may be not performing the ranging.

Figure 21:
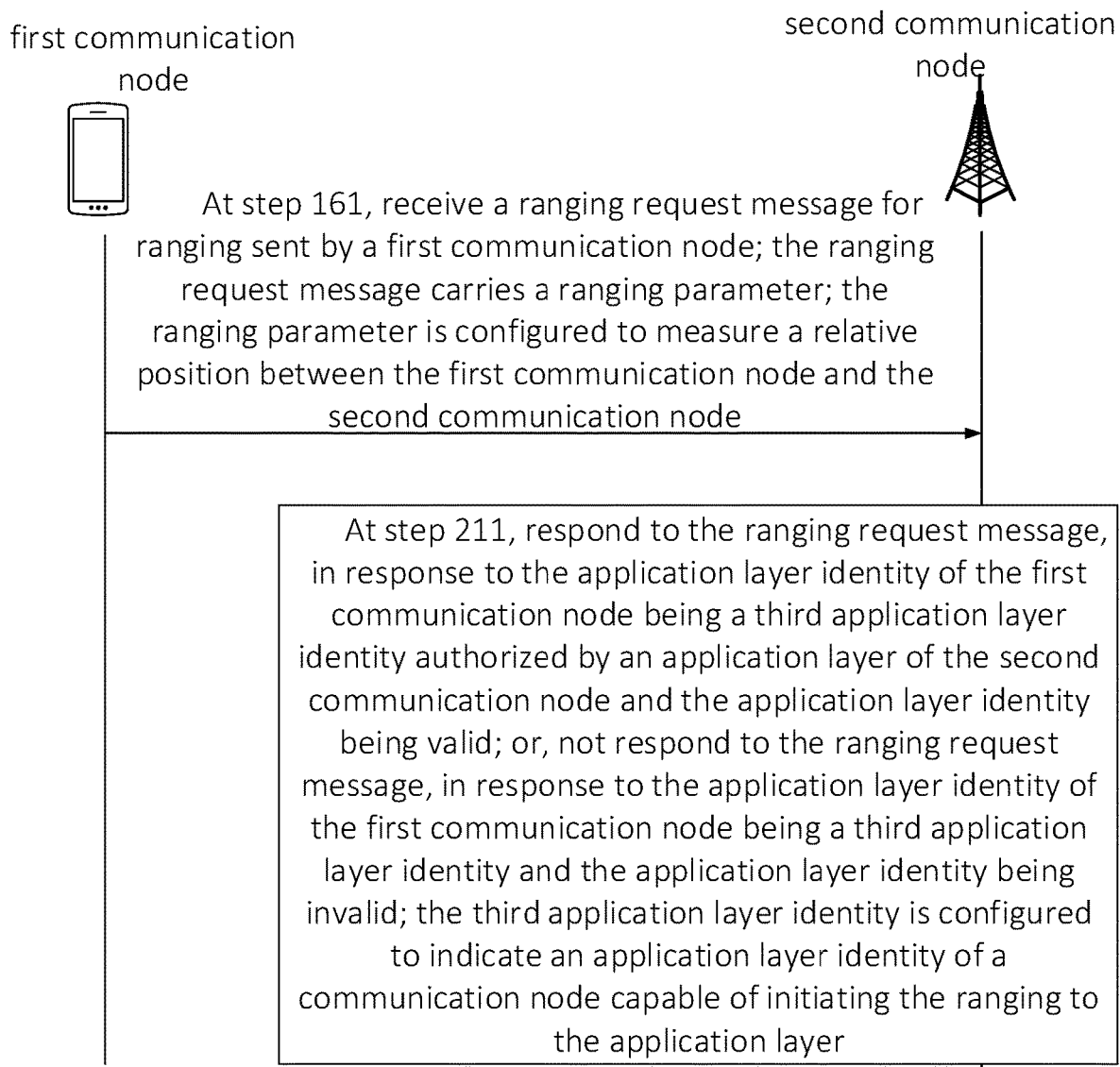
FIG. 21 is a flowchart illustrating a method for relative positioning according to some embodiments.

As illustrated in FIG. 21, in the ranging method according to embodiments, the ranging request message carries indication information indicating an application layer identity of the first communication node and indication information indicating a validity period of the application layer identity of the first communication node. The method further includes the following steps.

At step 211, the ranging request message is responded to, in response to the application layer identity of the first communication node being a third application layer identity authorized by an application layer of the second communication node and the application layer identity being valid; or, the ranging request message is not responded to, in response to the application layer identity of the first communication node being a third application layer identity and the application layer identity being invalid. The third application layer identity is configured to indicate an application layer identity of a communication node capable of initiating the ranging to the application layer.

In an embodiment, the application layer identity being valid may be that a time difference between a generation time of the application layer identity and a current time is within a preset time range. The application layer identity being invalid may be that a time difference between a generation time of the application layer identity and a current time is not within the preset time range.

Figure 22:
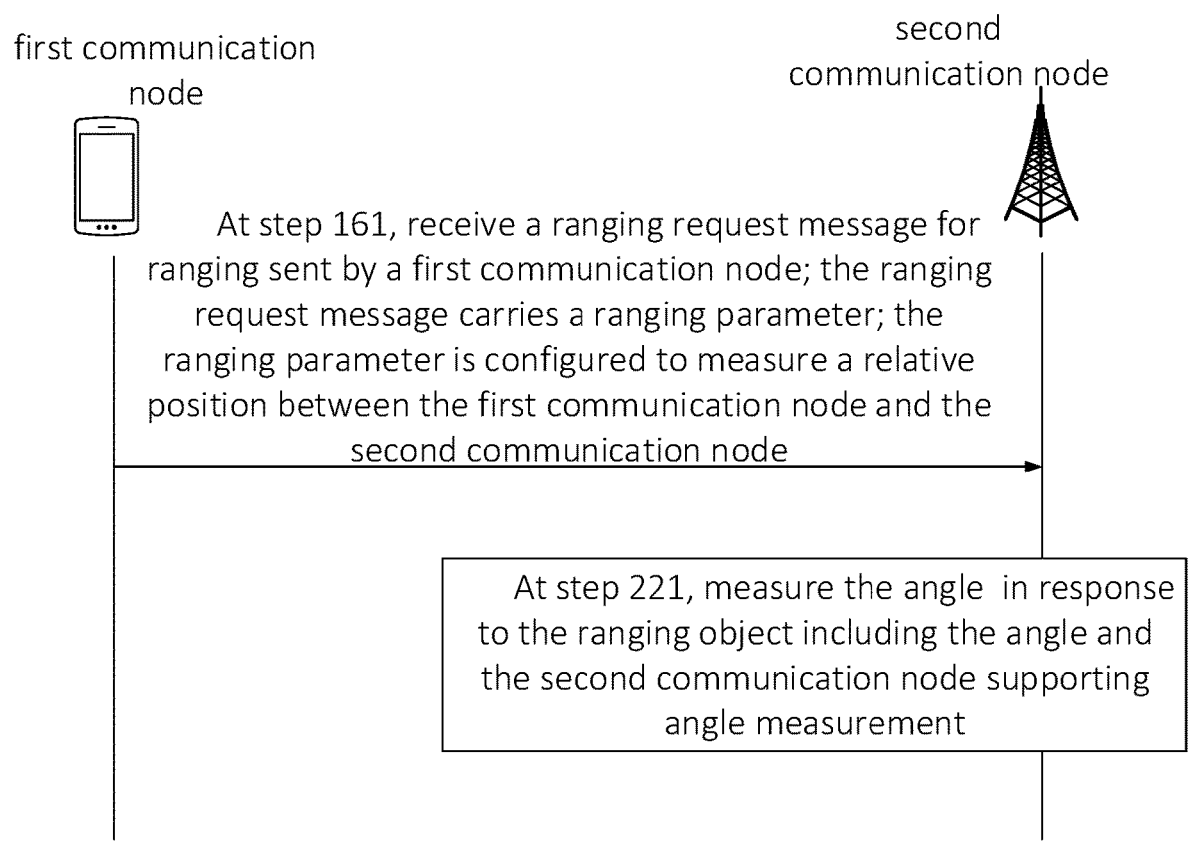
FIG. 22 is a flowchart illustrating a method for relative positioning according to some embodiments.

As illustrated in FIG. 22, in the ranging method according to embodiments, the ranging request message carries indication information indicating the ranging object. Responding to the ranging request message includes the following steps.

At step 221, the angle is measured in response to the ranging object including the angle and the second communication node supporting angle measurement.

In an embodiment, when needing to obtain the relative distance relationship of the second communication node relative to the first communication node, the ranging object is the distance. When needing to obtain the relative angle relationship of the second communication node relative to the first communication node, the ranging object is the angle. When needing to obtain the relative distance relationship of the second communication node relative to the first communication node and needing to obtain the relative angle relationship of the second communication node relative to the first communication node, the ranging objects include the distance and the angle.

In an embodiment, the angle is an AOA or an AOD.

Figure 23:
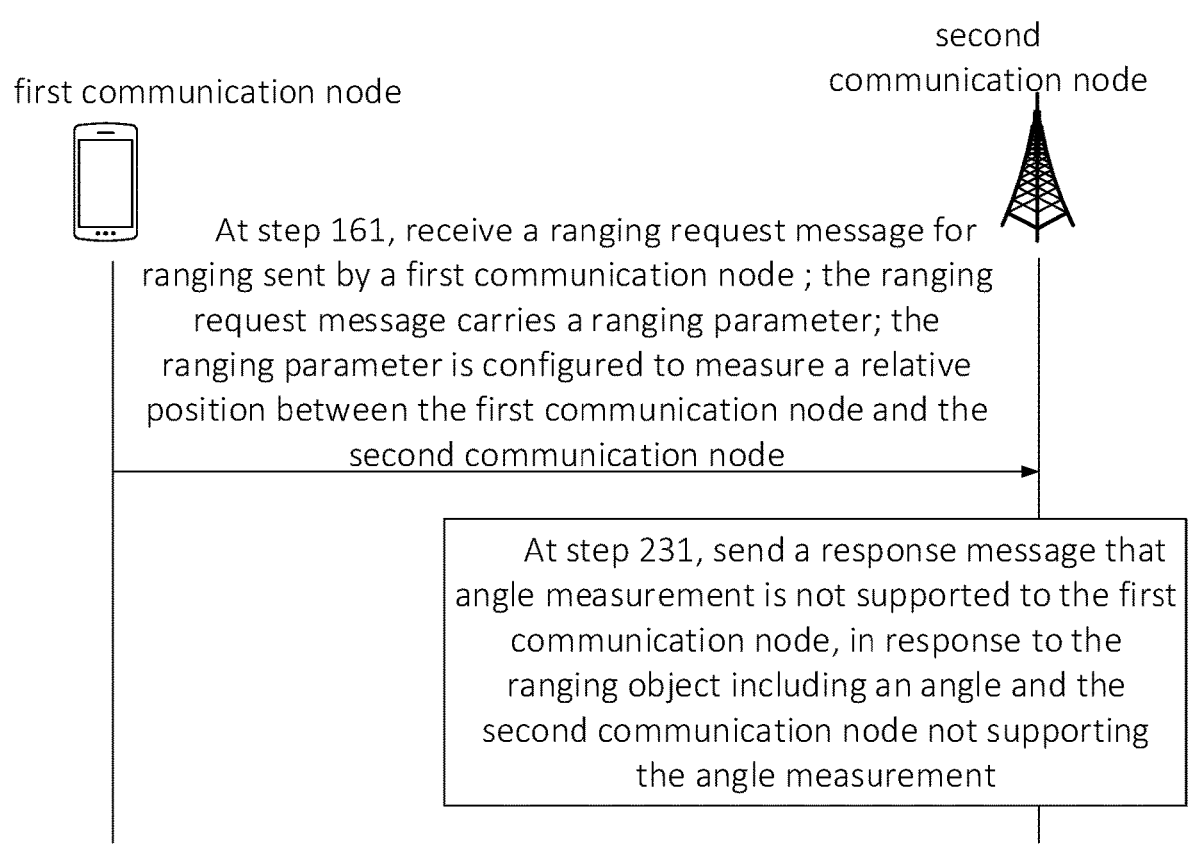
FIG. 23 is a flowchart illustrating a method for relative positioning according to some embodiments.

As illustrated in FIG. 23, in the ranging method according to embodiments, responding to the ranging request message, further includes the following steps.

At step 231, a response message that angle measurement is not supported is sent to the first communication node, in response to determining that the ranging object includes an angle and the second communication node not support the angle measurement.

In an embodiment, the first communication node may terminate performing the ranging after receiving the response message. In another embodiment, the first communication node only may measure the distance in performing the ranging after receiving the response message.

Figure 24:
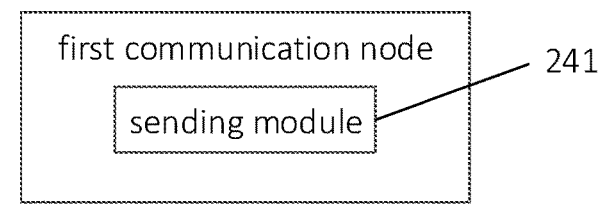
FIG. 24 is a schematic diagram illustrating a first communication node according to some embodiments.

As illustrated in FIG. 24, embodiments provide a first communication node. The communication device includes a sending module 241.

The sending module 241 is configured to send a ranging request message for ranging.

The ranging request message carries a ranging parameter. The ranging parameter is configured to measure a relative position between the first communication node and a second communication node.

Figure 25:
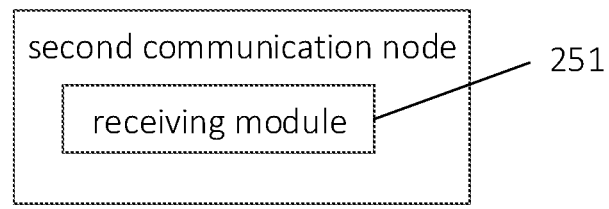
FIG. 25 is a schematic diagram illustrating a second communication node according to some embodiments.

As illustrated in FIG. 25, embodiments provide a second communication node. The communication node includes a receiving module 251.

The receiving module 251 is configured to receive a ranging request message for ranging sent by a first communication node.

The ranging request message carries a ranging parameter. The ranging parameter is configured to measure a relative position between the first communication node and the second communication node.

With regard to the apparatus in the above embodiments, the specific way in which each module performs the operation has been described in detail in the embodiments of the method and will not be elaborated here.

Embodiments provide a communication device. The communication device includes:
a processor; and
a memory configured to store instructions executable by the processor.

The processor is configured to perform the method described in the above any embodiment when running the instructions.

The processor may include various types of storage mediums. The storage medium is a non-transitory computer storage medium, and may continue memorizing and storing information thereon when a communication device is powered off.

The processor is connected to a memory via a bus, and may be configured to read an executable program stored on the memory.

Embodiments of the disclosure provide a computer storage medium stored. The computer storage medium has a computer-executable program stored thereon. When the computer-executable program is executed by a processor, the method as described in the above any embodiment is performed.

With regard to the apparatus in the above embodiments, the specific way in which each module performs the operation has been described in detail in the embodiments of the method and will not be elaborated here.

In an embodiment, a ranging method performed by a first communication node is further provided. The method includes:
determining, based on the ranging parameter, whether or not to perform ranging based on a secure connection;
in which the secure connection includes a secure unicast connection established based on a PC5 interface.

In an embodiment, the secure unicast connection includes:
a unicast connection using an encryption mechanism for ranging transmission.

In an embodiment, the ranging parameter includes a security requirement indication.

In an embodiment, determining, based on the ranging parameter, whether or not to perform the ranging based on the secure connection includes:
performing the ranging based on the secure connection, in response to the security requirement indication indicating that the secure connection is required for the ranging;
or,
performing the ranging based on a connection other than the secure connection, in response to the security requirement indication indicating that the secure connection is not required for the ranging.

In an embodiment, the connection other than the secure connection includes:
a broadcast connection;
a multicast connection; or
a unicast connection that does not use an encryption mechanism for ranging transmission.

In an embodiment, the ranging parameter includes at least one of:
a ranging precision;
a ranging range;
a ranging object, including a distance and/or an angle;

a first application layer identity authorized by an application layer of the first communication node, configured to indicate an application layer identity of a communication node capable of initiating the ranging to the application layer;

a validity period of the first application layer identity;

a second application layer identity authorized by an application layer, configured to indicate an application layer identity of a communication node capable of supporting, as a target communication node, the application layer to initiate the ranging;

a validity period of the second application layer identity; or the ranging method includes a single-sided ranging method and a double-sided ranging method, in which the single-sided ranging method is a method with which one communication node in both ranging parties sends a ranging signal to perform the ranging; and the double-sided ranging method is a method with which both ranging parties send ranging signals to perform the ranging.

In an embodiment, the method further includes:

receiving, by a ranging layer of the first communication node, a ranging request sent by an application layer of the first communication node, in which, the ranging request carries the ranging parameter; and the ranging layer is a PC5-Signalling (PC5-S) protocol layer of a ranging service.

In an embodiment, the method further includes:

sending a ranging request message for requesting ranging to the second communication node, in which, the ranging request message carries indication information indicating a connection determined for the ranging.

In an embodiment, the ranging request message further carries the ranging parameter.

In an embodiment, the ranging request message further carries an application layer identity of the first communication node and/or an application layer identity of the second communication node.

In an embodiment, a ranging method performed by a second communication node is further provided. The method includes:

performing ranging based on a connection determined based on a ranging parameter;

in which the connection includes: a secure connection or a connection rather than the secure connection; and the secure connection includes a secure unicast connection established based on a PC5 interface.

In an embodiment, the method further includes:

receiving a ranging request message for requesting ranging sent by the first communication node; in which the ranging request message further carries the ranging parameter; and determining, based on the ranging parameter, whether or not to perform the ranging based on the secure connection.

In an embodiment, the secure unicast connection includes:

a unicast connection using an encryption mechanism for ranging transmission.

In an embodiment, the ranging parameter includes a security requirement indication.

In an embodiment, determining, based on the ranging parameter, whether or not to perform ranging based on the secure connection includes:

performing the ranging based on the secure connection, in response to the security requirement indication indicating that the secure connection is required for the ranging;

or, performing the ranging based on a connection other than the secure connection, in response to the security requirement indication indicating that the secure connection is not required for the ranging. The secure connection includes a secure unicast connection established based on the PC5 interface.

In an embodiment, the connection other than the secure connection includes:

a broadcast connection;

a multicast connection; or a unicast connection that does not use an encryption mechanism for ranging transmission.

In an embodiment, the ranging request message carries indication information indicating the ranging range; and the method further includes:

responding to the ranging request message, in response to a distance between the first communication node and the second communication node being within the ranging range;

or, not responding to the ranging request message, in response to a distance between the first communication node and the second communication node not being within the ranging range.

In an embodiment, the ranging request message carries indication information indicating an application layer identity of the first communication node; and the method further includes:

responding to the ranging request message, in response to the application layer identity of the first communication node being a third application layer identity authorized by an application layer of the second communication node;

or, not responding to the ranging request message, in response to the application layer identity of the first communication node not being a third application layer identity; in which the third application layer identity is configured to indicate an application layer identify of a communication node capable of initiating the ranging to the application layer.

In an embodiment, the ranging request message carries indication information indicating an application layer identity of the first communication node and indication information indicating a validity period of the application layer identity of the first communication node; and the method further includes:

responding to the ranging request message, in response to the application layer identity of the first communication node being a third application layer identity authorized by an application layer of the second communication node and the application layer identity being valid;

or, not responding to the ranging request message, in response to the application layer identity of the first communication node being a third application layer identity authorized by an application layer of the second communication node and the application layer identity being invalid; the third application layer identity is configured to indicate an application layer identity of a communication node capable of initiating the ranging to the application layer.

In an embodiment, the ranging request message carries indication information indicating the ranging object; and responding to the ranging request message includes:

measuring the angle in response to the ranging object including the angle and the second communication node supporting angle measurement.

In an embodiment, responding to the ranging request message further includes:

sending a response message that the angle measurement is not supported to the first communication node, in response to the ranging object including the angle and the second communication node not supporting the angle measurement.

In embodiments of the disclosure, the ranging request message for ranging is sent; and the ranging request message carries the ranging parameter. In this way, the second communication node may perform the ranging based on the ranging parameter carried in the ranging request message and measure a relative position between the first communication node and the second communication node after receiving the ranging request message sent by the first communication node. Therefore, the second communication node may perform the ranging based on an indication of the ranging parameter sent by the first communication node, which is more adapted to the ranging requirement of the first communication node compared with performing the ranging by the second communication node based on a fixed ranging parameter.

Figure 26:
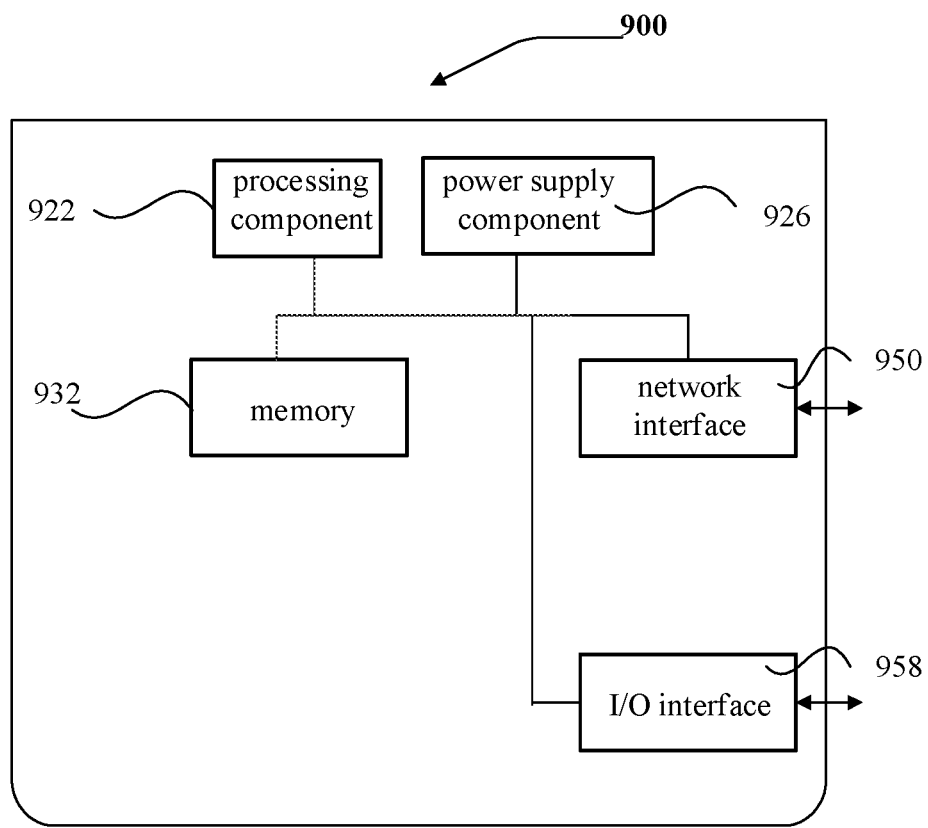
FIG. 26 is a block diagram illustrating a base station according to some embodiments.

FIG. 26 is a block diagram illustrating a structure of a base station according to one embodiment of the disclosure. For example, a base station 900 may be provided as a network side server. As illustrated in FIG. 26, the base station 900 includes a processing component 922, which further includes one or more processors, and memory resources represented by a memory 932, which are configured to store instructions executable by the processing component 922, for example, an application. The application stored in the memory 932 may include one or more modules each of which corresponds to a set of instructions. In addition, the processing component 922 is configured to execute instructions, to perform the any method applicable to the base station as described in the above method, for example, the methods as illustrated in FIGS. 2 to 6.

The base station 900 may further include one power supply component 926 configured to execute power management of the base station 900, one wired or wireless network interface 950 configured to connect the base station 900 to a network, and one input/output (I/O) interface 958. The base station 900 may operate an operating system stored in the memory 932, for example, Windows Server™, Mac OS X™, Unix™, Linux™, FreeBSD™ or similar.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as examples only, and the true scope and spirit of the disclosure are given by the appended claims.

It is understandable that the disclosure is not limited to the precise structure described above and shown in the drawings, and various modifications and changes may be made without departing from its scope. The scope of the disclosure is only limited by the appended claims.

What is claimed is:

1. A ranging method, performed by a first communication node, the method comprising:
   sending a ranging request message for ranging;
   wherein the ranging request message carries a ranging parameter; the ranging parameter is configured to measure a relative position between the first communication node and a second communication node;
   wherein the ranging parameter comprises at least one of:
   a security requirement indication, configured to indicate that a secure connection is required for the ranging or a secure connection is not required for the ranging;
   a ranging precision;
   a ranging range;
   a ranging object, comprising at least one of a distance or an angle;
   a first application layer identity authorized by an application layer of the first communication node, configured to indicate an application layer identity of a communication node capable of initiating the ranging to the application layer;
   a validity period of the first application layer identity;
   a second application layer identity authorized by the application layer, configured to indicate an application layer identity of a communication node capable of supporting, as a target communication node, the application layer to initiate the ranging;
   a validity period of the second application layer identity; or
   an indication of a ranging method, wherein the ranging method comprises a single-sided ranging method and a double-sided ranging method, wherein the single-sided ranging method is a method with which one communication node in both ranging parties sends a ranging signal to perform the ranging; and the double-sided ranging method is a method with which both ranging parties send ranging signals to perform the ranging.

2. The method of claim 1, further comprising:
   receiving, by a ranging layer of the first communication node, a ranging request sent by an application layer of the first communication node, wherein, the ranging request carries the ranging parameter; and the ranging layer is a PC5-Signalling (PC5-S) protocol layer of a ranging service.

3. The method of claim 1, wherein, the ranging parameter comprises security requirement information; and the method further comprising:
   determining, based on the security requirement information, whether or not to perform the ranging based on a secure connection; wherein the secure connection comprises a secure unicast connection established based on a PC5 interface.

4. The method of claim 3, wherein determining, based on the security requirement information, whether or not to perform ranging based on the secure connection comprises:
   performing the ranging based on the secure connection, in response to the security requirement information indicating that the secure connection is required for the ranging;
   or,
   performing the ranging based on a connection other than the secure connection, in response to the security requirement information indicating that the secure connection is not required for the ranging.

5. The method of claim 4, wherein the connection other than the secure connection comprises at least one of:
   a broadcast connection;

a multicast connection; or a unicast connection that does not use an encryption mechanism for ranging transmission.

6. The method of claim 3, wherein the secure unicast connection comprises:

a unicast connection using an encryption mechanism for ranging transmission.

7. The method of claim 1, wherein the ranging request message further carries at least one of an application layer identity of the first communication node or an application layer identity of the second communication node.

8. A ranging method, performed by a second communication node, the method comprising:

receiving a ranging request message for ranging sent by a first communication node;

wherein the ranging request message carries a ranging parameter; the ranging parameter is configured to measure a relative position between the first communication node and the second communication node;

wherein, the ranging parameter comprises at least one of:

a security requirement indication, configured to indicate that a secure connection is required for the ranging or a secure connection is not required for the ranging;

a ranging precision;

a ranging range;

a ranging object, comprising at least one of a distance or an angle;

a first application layer identity authorized by an application layer of the first communication node, configured to indicate an application layer identity of a communication node capable of initiating the ranging to the application layer;

a validity period of the first application layer identity;

a second application layer identity authorized by an application layer, configured to indicate an application layer identity of a communication node capable of supporting, as a target communication node, the application layer to initiate the ranging;

a validity period of the second application layer identity; or an indication of a ranging method, wherein the ranging method comprises a single-sided ranging method and a double-sided ranging method, wherein the single-sided ranging method is a method with which one communication node in both ranging parties sends a ranging signal to perform the ranging; and the double-sided ranging method is a method with which both ranging parties send ranging signals to perform the ranging.

9. The method of claim 8, wherein the ranging parameter comprises security requirement information; and the method further comprising:

determining, based on the security requirement information, whether or not to perform the ranging based on a secure connection; wherein the secure connection comprises a secure unicast connection established based on a PC5 interface.

10. The method of claim 9, wherein determining based on the security requirement information, whether or not to perform ranging based on the secure connection comprises:

performing the ranging based on the secure connection, in response to the security requirement information indicating that the secure connection is required for the ranging;

or, performing the ranging based on a connection other than the secure connection, in response to the security requirement information indicating that the secure connection is not required for the ranging.

11. The method of claim 10, wherein the connection other than the secure connection comprises at least one of:

a broadcast connection;

a multicast connection; or a unicast connection that does not use an encryption mechanism for ranging transmission.

12. The method of claim 9, wherein the secure unicast connection comprises:

a unicast connection using an encryption mechanism for ranging transmission.

13. The method of claim 8, wherein the ranging request message carries indication information indicating the ranging range; and the method further comprising:

responding to the ranging request message, in response to a distance between the first communication node and the second communication node being within the ranging range;

or, not responding to the ranging request message, in response to a distance between the first communication node and the second communication node not being within the ranging range.

14. The method of claim 8, wherein the ranging request message carries indication information indicating an application layer identity of the first communication node; and the method further comprising:

responding to the ranging request message, in response to the application layer identity of the first communication node being a third application layer identity authorized by an application layer of the second communication node;

or, not responding to the ranging request message, in response to the application layer identity of the first communication node not being a third application layer identity authorized by an application layer of the second communication node; wherein the third application layer identity is configured to indicate an application layer identify of a communication node capable of initiating the ranging to the application layer.

15. The method of claim 8, wherein the ranging request message carries indication information indicating an application layer identity of the first communication node and indication information indicating a validity period of the application layer identity of the first communication node; and the method further comprising:

responding to the ranging request message, in response to the application layer identity of the first communication node being a third application layer identity authorized by an application layer of the second communication node and the application layer identity being valid;

or, not responding to the ranging request message, in response to the application layer identity of the first communication node being a third application layer identity authorized by an application layer of the second communication node and the application layer identity being invalid; wherein the third application layer identity is configured to indicate an application layer identity of a communication node capable of initiating the ranging to the application layer.

16. The method of claim 13, wherein the ranging request message carries indication information indicating the ranging object; and responding to the ranging request message comprising:

measuring the angle in response to the ranging object comprising the angle and the second communication node supporting angle measurement; or sending a response message that the angle measurement is not supported to the first communication node, in response to the ranging object comprising the angle and the second communication node not supporting the angle measurement.

17. A communication device, comprising:

an antenna;

a memory; and a processor, connected to the antenna and the memory, configured to control transmitting and receiving of the antenna by executing computer-executable instructions stored on the memory, wherein the processor is configured to:

send a ranging request message for ranging;

wherein the ranging request message carries a ranging parameter; the ranging parameter is configured to measure a relative position between a first communication node and a second communication node;

wherein, the ranging parameter comprises at least one of:

a security requirement indication, configured to indicate that a secure connection is required for the ranging or a secure connection is not required for the ranging;

a ranging precision;

a ranging range;

a ranging object, comprising at least one of a distance or an angle;

a first application layer identity authorized by an application layer of the first communication node, configured to indicate an application layer identity of a communication node capable of initiating the ranging to the application layer;

a validity period of the first application layer identity;

a second application layer identity authorized by an application layer, configured to indicate an application layer identity of a communication node capable of supporting, as a target communication node, the application layer to initiate the ranging;

a validity period of the second application layer identity; or an indication of a ranging method, wherein the ranging method comprises a single-sided ranging method and a double-sided ranging method, wherein the single-sided ranging method is a method with which one communication node in both ranging parties sends a ranging signal to perform the ranging; and the double-sided ranging method is a method with which both ranging parties send ranging signals to perform the ranging.

18. A communication device, comprising:

an antenna;

a memory; and a processor, connected to the antenna and the memory, configured to control transmitting and receiving of the antenna by executing computer-executable instructions stored on the memory, wherein the processor is configured to perform a ranging method of claim 8.

* * * * *